(12) United States Patent
Jelvis et al.

(10) Patent No.: US 11,580,490 B2
(45) Date of Patent: Feb. 14, 2023

(54) SUPPLY CHAIN REPLENISHMENT SIMULATION

(71) Applicant: Target Brands, Inc., Minneapolis, MN (US)

(72) Inventors: Tikhon Jelvis, Sunnyvale, CA (US); Kaveh Khodjasteh, San Francisco, CA (US)

(73) Assignee: TARGET BRANDS, INC., Minneapolis, MN (US)

( * ) Notice: Subject to any disclaimer, the term of this patent is extended or adjusted under 35 U.S.C. 154(b) by 40 days.

(21) Appl. No.: 16/858,427

(22) Filed: Apr. 24, 2020

(65) Prior Publication Data

US 2021/0334738 A1    Oct. 28, 2021

(51) Int. Cl.
*G06Q 10/087* (2023.01)
*G06Q 30/0202* (2023.01)
*G06Q 10/0633* (2023.01)
*G05B 17/02* (2006.01)

(52) U.S. Cl.
CPC ....... *G06Q 10/087* (2013.01); *G06Q 10/0633* (2013.01); *G06Q 30/0202* (2013.01); *G05B 17/02* (2013.01)

(58) Field of Classification Search
CPC .............. G06Q 10/87; G06Q 10/0633; G06Q 30/0202; G06Q 10/087; G05B 17/02
USPC .......................................................... 705/28
See application file for complete search history.

(56) References Cited

U.S. PATENT DOCUMENTS

| | | | |
|---|---|---|---|
| 7,499,766 B2 | 3/2009 | Knight et al. | |
| 8,494,823 B2 | 7/2013 | Ding et al. | |
| 9,633,323 B2 | 4/2017 | Fairbrother et al. | |
| 10,062,052 B2 | 8/2018 | Saylor et al. | |
| 10,796,322 B1 * | 10/2020 | Ramalingam | ......... H04L 47/822 |
| 2005/0177353 A1 | 8/2005 | Slater | |
| 2009/0030667 A1 | 1/2009 | Toloo et al. | |

(Continued)

FOREIGN PATENT DOCUMENTS

| CN | 109960826 A | 7/2019 |
|---|---|---|
| JP | 2009134468 A | 6/2009 |

OTHER PUBLICATIONS

Jalali et al., "Simulation optimization in inventories replenishment: a classification"; Research Center for Operation Management, Department of Decision Sciences and Information Management; 32 Pages, 2013.

Hellstrom et al., "Using Discrete Event Simulation in Supply Chain Planning"; 14 Pages, 2002.

Thierry et al., "Supply Chain Management Simulation: An Overview"; 36 Pages, 2008.

(Continued)

*Primary Examiner* — Garcia Ade
(74) *Attorney, Agent, or Firm* — Merchant & Gould P.C.

(57) ABSTRACT

Event-based replenishment simulation for an enterprise supply chain is described. On a per item, per node, per epoch basis, the simulation may generate a stream of action events based on forecasted demand, supply chain logic, and policy inputs that are applied to a current-run state of the supply chain in order to yield a stream of observation events. Requested metrics may be received, and the observation events may then be transformed to predict values for the metrics as output of the simulation. The simulation may be repeated for a given epoch using discrete demand values from a demand distribution, for a plurality of epochs, and/or across a plurality of items at a plurality of nodes. Resultantly, the simulation output can be used for predicting a future run-state of the supply chain across items and nodes.

21 Claims, 10 Drawing Sheets

(56) References Cited

U.S. PATENT DOCUMENTS

| | | | |
|---|---|---|---|
| 2013/0018696 A1 | 1/2013 | Meldrum | |
| 2013/0024225 A1 | 1/2013 | Perry et al. | |
| 2013/0046574 A1* | 2/2013 | Griep | G06Q 10/06311 |
| | | | 705/7.25 |
| 2014/0058794 A1* | 2/2014 | Malov | G06Q 10/087 |
| | | | 705/7.31 |
| 2014/0200946 A1* | 7/2014 | Humphries | G06Q 10/087 |
| | | | 705/7.25 |
| 2016/0321606 A1* | 11/2016 | Kapil | G06Q 30/0633 |
| 2017/0034035 A1* | 2/2017 | Coleman | H04L 67/535 |
| 2018/0308030 A1* | 10/2018 | Nemati | G06Q 10/06314 |
| 2019/0220556 A1* | 7/2019 | Yeager | G06F 30/20 |
| 2021/0117910 A1* | 4/2021 | Koc | H04L 9/0637 |

OTHER PUBLICATIONS

Genc et al., "Event-Based Supply Chain Early Warning System for an Adaptive Production Control", Procedia CIRP 19, 6 Pages, 2014.

Umeda, S. and Jones, A.., "Virtual Supply Chain Management System: A decision support system using discrete event simulation"; National Institute of Standards and Technology, 8 Pages, 1995.

Supply Chain Simulation Software—Any Logic Simulation Software, 5 Pages, Jul. 21, 2019.

U.S. Appl. No. 62/776,327, filed Dec. 6, 2018—entitled Platform Using Swappable Policies to Simulate and Perform Warehouse Processes; 51 Pages.

U.S. Appl. No. 62/835,961, filed Apr. 18, 2019—entitled Platform Using Instruction Engine to Simulate and Perform Warehouse Processes, 56 Pages.

* cited by examiner

SUPPLY CHAIN REPLENISHMENT SIMULATION

BACKGROUND

A supply chain network of an enterprise may be comprised of nodes, including distribution centers and stores. Units of an inventory item may initially flow from a distribution center to a store through an initial fulfillment process that is initiated by the store submitting a transfer order to the distribution center. As a number of units of the inventory item diminish and/or more units are desired at the store, subsequent units of the inventory item may be provided from the distribution center to the store through a replenishment process that is similarly initiated by the store submitting a transfer order to the distribution center.

The timing and logic involved in a replenishment process is complex. For example, a replenishment process may involve the flow of inventory item units from the distribution center to the store responsive to transfer orders, but may be based on, e.g., inventory levels, re-order points, stocking levels, picking and packing management, order lead times, and/or transit times, among other similar factors. Still further, in supply chain systems of significant size and complexity (e.g., often including hundreds or thousands of store locations, numerous distribution centers, and vendors) decisions regarding how best to allocate inventory across that supply chain are highly complex, due to the changing demand, inventory levels, etc. at each location. Accordingly, it can be difficult to visualize or model how a particular item or collection of items flows through a supply chain with an adequate level of detail to avoid significant real-world consequences such as out-of-stock events.

In some instances, simulation systems have been developed that assist with modeling, at a high level of generality, movement of an item within a supply chain. However, such simulation systems have drawbacks. For example, because of the non-deterministic nature of some supply chain inputs (e.g., demand, availability times for particular items, etc.) outcomes of simulations may vary between runs of the simulation, leading to uncertainty in outcomes. Still further, some aspects of supply chain operation may be non-deterministic as well (e.g., handling times at particular supply chain nodes, transit times, etc.), leading to greater uncertainty in simulation outcomes. This is because simulations typically must use, at the time of execution, discrete values selected from those non-deterministic inputs and operational parameters, leading to variability in simulation results.

Particularly when applied to very large scale supply chain systems, the above challenges are exacerbated. This is because variable/non-deterministic occurrences at one location in a supply chain (e.g., a large demand at a particular store, or a delay in shipment that may occur occasionally) may have drastic effects on other portions of the supply chain. Additionally, while repeated execution of such simulations may provide some insight into the possible simulation outcomes, such repeated operation may require significant computation resources, particularly if the simulation is performed with a high level of granularity that is often required to obtain insights regarding potential supply chain interruptions.

Accordingly, it is with respect to these and other general considerations that embodiments have been described.

SUMMARY

In accordance with the present disclosure, the above and other issues are addressed by the following:

In a first aspect, example methods for simulating a per epoch run-state of a supply chain for an item at a node of a network are described. In an example method, for an epoch, a plurality of inputs are received. The plurality of the inputs may include at least a forecasted demand distribution for the item at the node, domain logic associated with the supply chain, and one or more policies. The method can include executing at least one iteration of a simulation process for the epoch at the node, by generating a stream of action events based on the plurality of inputs, a current run-state of the supply chain may be retrieved, and the stream of action events may be applied to the current run-state of the supply chain to yield a stream of observation events. A request for one or more metrics may be received, and the stream of observation events may be transformed to predict a value for the one or more metrics. The predicted value for the one or more metrics may be provided as output for the epoch.

In a second aspect, example systems for simulating a per epoch run-state of a supply chain for an item at a node of a network are described. An example system may include a processor, and a memory communicatively coupled to the processor that stores instructions. When executed by the processor, the instructions cause the system to for an epoch, receive a plurality of inputs. The plurality of the inputs may include at least a forecasted demand distribution for the item at the node, domain logic associated with the supply chain, and one or more policies. The instructions further cause the system to executing at least one iteration of a simulation process for the epoch at the node, by causing the system to generate a stream of action events based on the plurality of inputs, retrieve a current run-state of the supply chain, and apply the stream of action events to the current run-state of the supply chain to yield a stream of observation events. The instructions further cause the system to receive a request for one or more metrics, transform the stream of observation events to predict a value for the one or more metrics, and provide the predicted value for the one or more metrics as output for the epoch, where a future run-state of the supply chain is generated based on output for a plurality of epochs, including the epoch.

In a third aspect, example non-transitory computer-readable media with instructions stored thereon for simulating a per epoch run-state of a supply chain for an item at a node of a network are described. The instructions may include receiving, for an epoch, a plurality of inputs for a future epoch, including at least a forecasted demand distribution for the item at the node, domain logic associated with the supply chain, and one or more policies. The instructions may also include executing at least one iteration of a simulation process for the epoch at the node, by generating a stream of action events based on the plurality of inputs, retrieving a current run-state of the supply chain, and applying the stream of action events to the current run-state of the supply chain to yield a stream of observation events. The instructions may further include receiving a request for one or more metrics, transforming the stream of observation events to predict a value for the one or more metrics, and providing the predicted value for the one or more metrics as output for the epoch, where a future run-state of the supply chain is generated based on output for a plurality of epochs, including the epoch.

BRIEF DESCRIPTION OF THE DRAWINGS

Non-limiting and non-exhaustive examples are described with reference to the following figures.

DETAILED DESCRIPTION

Figure 1:
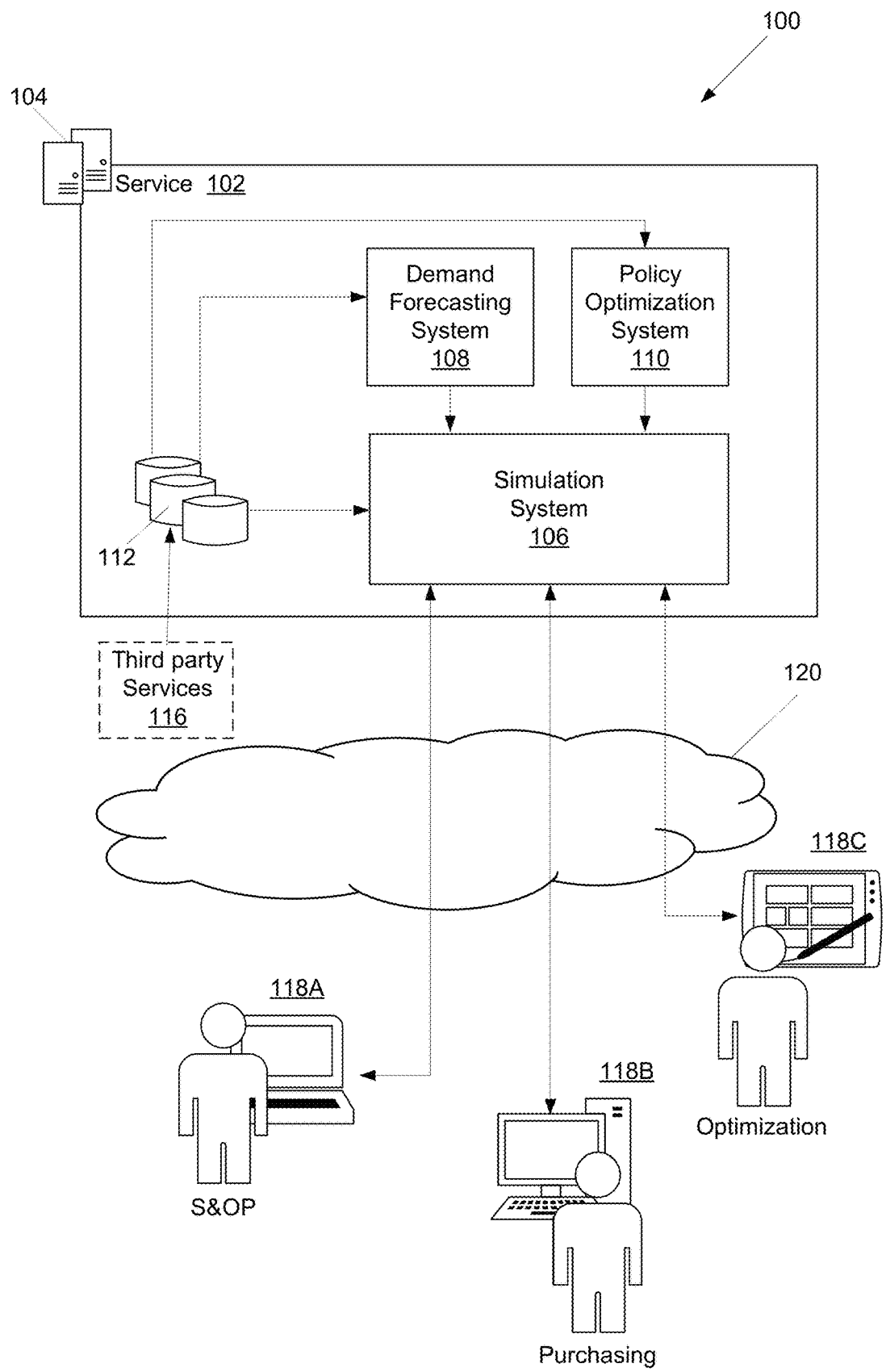
FIG. 1 illustrates an example network environment where a system to simulate supply chain replenishment may be implemented.

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

Aspects of the present invention are directed to an event-based replenishment simulation system for a supply chain of an enterprise. As previously discussed, units of an item may flow between nodes of the supply chain network (e.g., from a vendor to a distribution center, and in turn to a store). These processes may be initiated by purchase orders and/or transfer orders that indicate a quantity of item units, source and destination nodes, and a transit schedule. Initiation of transfer orders within a large-scale supply chain may be based on inventory levels, re-order points, stocking levels, order lead times, transit times, and/or purchase order changes, among other data, in addition to demand forecasts. A transfer order may have many additional or subsidiary effects on stock levels and handling processes, including breakage of package sizes, which may trigger additional processes for stocking and inventory counting/control.

Thus, to account for the complexity when simulating supply chain replenishment, inputs such as business process data and assumptions, including supply chain logic and policies, are provided for the simulation in addition to demand forecast. Based on these inputs, the simulation may output data related to inventory and changes thereto that can be used for predicting a run-state of the supply chain for tens to hundreds of days in the future to inform labor planning decisions and vendor purchases, among other business decisions. Additionally, the simulation may enable experimentation (e.g. performance of "what if" scenarios) and debugging to determine how changes to certain inputs, including demand, supply chain logic, and policies, effect the replenishment process.

In some examples, because replenishment is specific to each item and each node, the supply chain in the simulation is described at a per-item, per-node level by an amount of inventory and a list of incoming transfers. A run-state of the supply chain is a function of time, and the time evolution of the run-state of the supply chain is governed by supply chain dynamics. The dynamics may be effected by sales (e.g., the realization of demand and item availability), transfers (e.g., the realization of scheduled moves between nodes), and policy evaluation (e.g., policy decisions made to update transfer schedule), and thus inputs to the simulation include forecasted demand, supply chain domain logic, and policies.

Additionally, the simulation is formed around events. An event refers to a piece of data at a specific moment of time and may represent changes or new observations about a system or process. For example, simulation dynamics may be described generally as taking in action events determined based on the inputs to the simulation, and producing observation events as a result of and/or corresponding to the current action events. Increased specificity of the events can facilitate the building and interpreting of a highly granular simulation. As one example, a forecasted demand provided as input to the simulation may include a single event for an epoch (e.g., five sales for a day) or, if higher granularity is desired, the forecasted demand may include multiple events at particular times over the epoch (e.g. one sale in early morning after opening, three sales around noon hour, and one sale just prior to closing, or some other configurable timing over the course of the day). Accordingly, a user of the simulation system described herein may, at the time of simulation, select a desired level of granularity of particular events, thereby providing run-time configurable tradeoff between increased detail and computational complexity or reduced detail and lower computational complexity.

The events (e.g., including input events and observation events) are then transformed into metrics through an aggregation process that is independent of the simulation dynamics. Some of the inputs to the simulation, such as forecasted demand and certain aspects of the supply chain domain logic, represent random processes that are sources of uncertainty in any metric that the simulation produces. Therefore, to better assess and remove uncertainty from the metrics output, the simulation may be repetitively re-run using different discrete values for that given metric (e.g., weighted according to a statistical distribution of possible values) to produce a sample of traces that can be aggregated and used to build statistics regarding supply chain operation.

In some examples, the simulation may be run on a per-epoch basis for a plurality of epochs. For example, an epoch may be a day, and the simulation may be run for more than one epoch, e.g., to predict the run-state of the supply chain for up to hundreds of days into the future on a per-item, per-node basis. Moreover, although the simulation is performed on a per-item, per-node basis, iterations of the simulation may be run for a plurality of items at a node, and across a plurality of nodes of the enterprise. Resultantly, a future-state of the supply chain for the plurality of epochs may be generated that represents the plurality of nodes of the network and the plurality of items at each node. Additionally, the simulation may be highly parallel and scalable by separating iterations of a specific item or iterations for different items, on different nodes for easy consumption and clustering.

FIG. 1 illustrates an example network environment where a system 106 to simulate supply chain replenishment may be implemented, referred to hereafter as the simulation system 106. The simulation system 106 may be hosted by a service 102. In some examples, the service 102 may also host a demand forecasting system 108 and a policy optimization system 110. One or more servers or processors 104 may be operable to execute one or more components of the service 102, including the simulation system 106, the demand forecasting system 108, and the policy optimization system 110. In other examples, one or both of the demand forecasting system 108 and the policy optimization system 110 are hosted externally by third party services 116.

In some examples, the service 102 may be associated with an enterprise, such as a retail enterprise that offers goods and/or services, also referred to herein as items, directly to consumers. In addition to online channels, the enterprise may have a plurality of physical stores through which items are sold. Additionally, the enterprise may have or be associated with one or more distribution centers that store the items until they are needed at one or more of the stores, or delivered directly to customers via online sales channels. The distribution centers and stores may comprise nodes of a supply chain network for the enterprise.

The simulation system 106 may perform the simulation on a per-item, per-node, and per-epoch basis. As per-epoch input, the simulation system 106 may receive at least supply chain domain logic, a demand for an item at a node predicted by the demand forecasting system 108, and one or more policies generated by the policy optimization system 110. As described in more detail with reference to FIGS. 2-6 below, the simulation system 106 may process the domain logic, the demand, and the policies to generate a stream of action events. A stream of corresponding observed events may be generated from the stream of action events. The stream of observed events, optionally in combination with the action events and inputs, may then be transformed into metrics, and values thereof are provided as output of the simulation system 106.

In some examples, one or more of the inputs received by the simulation system 106 may be generated internally by the service 102 and subsequently stored in the data stores 112. In other examples, one or more of the inputs may be generated externally by the third party services 116 and provided to the service 102 for storage in the data stores 112. As described in greater detail with reference to FIG. 3, at least some of the supply chain domain logic received as input may include network inputs, product inputs, node inputs, arc inputs, and operation perturbations, among other example inputs. Some portions of the supply chain domain logic in addition to other data may be used by the demand forecasting system 108 to predict the demand for the item and the policy optimization system 110 to generate one or more policies. In some examples, each type of data may be stored in separate data stores 112. In other examples, the various types of data may be combined in one or more of the data stores 112.

In one embodiment, the service 102 may interoperate with various applications to enable users affiliated with the enterprise to submit requested metrics to and subsequently receive corresponding values for the metrics (e.g., the output from the simulation system 106) over a network 120. For example, the users may execute a thin version of an application (e.g., a web browser) or a thick version of the application (e.g., a locally installed application) through devices 118A, 118B, and 118C, collectively devices 118. The devices 118 may include a desktop computer, a laptop computer, a tablet computer, a smart phone, or wearable computing device, among other similar devices. An application programming interface (API) may facilitate communication between the service 102 and the devices 118 and/or the simulation system 106 and the devices 118 over one or more networks, such as the network 120.

In some examples, the users may be affiliated with different aspects of the enterprise supply chain management, such as sales and operations planning (S&OP), purchasing, and optimization. One or more of S&OP, purchasing, and optimization, may utilize certain types of the output (e.g., values for certain metrics) as input for subsequent processes. Therefore, the types of metrics requested may be based on which aspect of the enterprise supply chain management the user is affiliated with, as discussed in greater detail with reference to FIG. 6 below. The types of metrics requested may be additionally or alternatively based on a type of simulation being performed, as discussed in greater detail with reference to FIG. 6 below.

Figure 2:
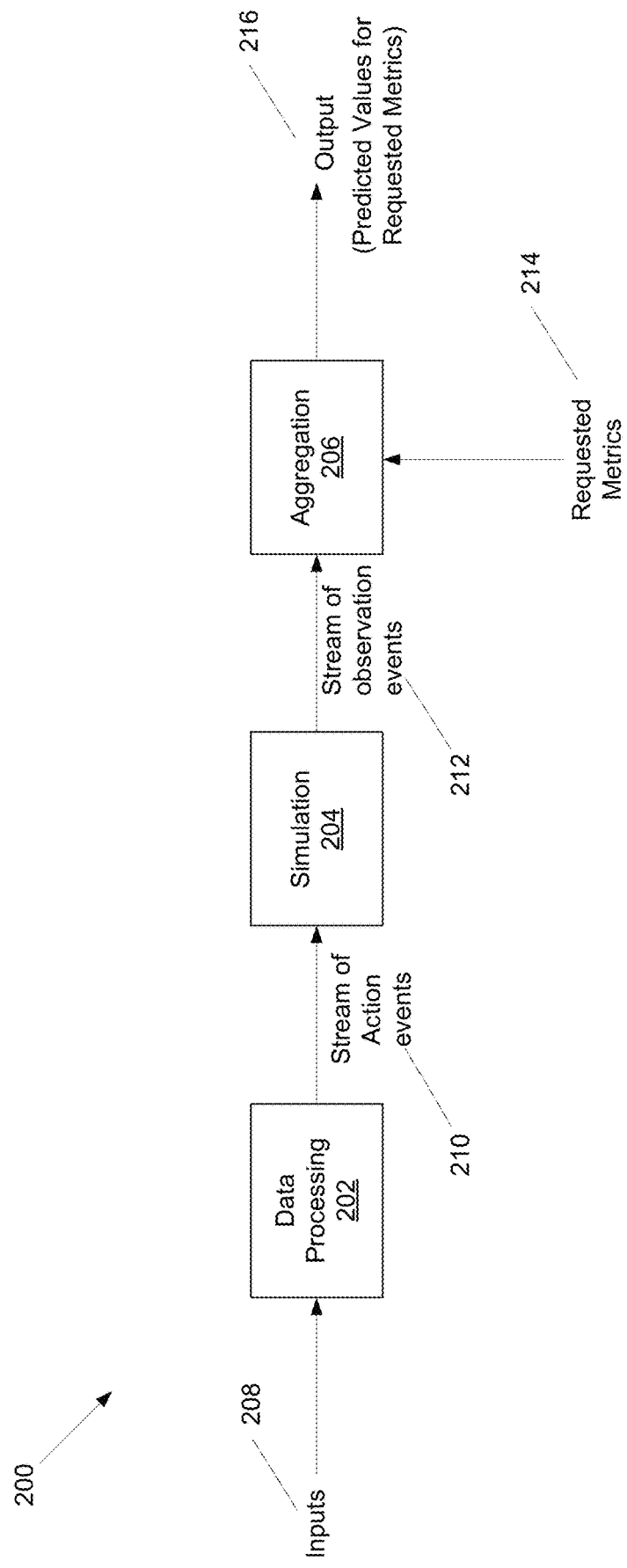
FIG. 2 is a conceptual diagram illustrating example processes of the simulation system.

FIG. 2 is a conceptual diagram illustrating example processes 200 of the simulation system 106. Example processes performed by the simulation system 106 may include at least data processing 202, simulation 204, and aggregation 206. The simulation system 106 may perform these processes on a per-item, per-node, and per-epoch basis for an enterprise supply chain network.

In some examples, the node may be a store (e.g., a child node) that receives and sells items. In other examples, the node may be a distribution center (e.g., a parent node) that receives and processes items to send to one or more stores or other distribution centers. For the simulation system 106, the node defines at least an initial state of inventory, including whether the item is in a backroom or on a shelf, and business parameters, including shelf capacity and package count, for the node. If the node is a distribution center, the node further defines the child nodes it replenishes and a lead time to reach each of the child nodes, incoming vendor purchase plans, and truck mechanics (e.g., truck schedules).

An epoch may be a predefined interval of time. One example epoch may be a day defined by a node's hours (e.g., from opening until closing). More specifically, the epoch may be a day that has not yet occurred, and thus the epoch may be a future epoch. A number of epochs to be run by the simulation system 106 may be defined. As one example, a plurality of epochs up to hundreds of days into the future may be defined.

Additionally, because the simulation system 106 utilizes input data associated with random processes, such as demand or even scheduled transfers, predicted values for requested metrics output by the simulation system 106 may have lesser certainty. Therefore, to increase certainty, the simulation system 106 may repetitively perform these processes for a same item at a same node per epoch to build statistics for the underlying probability distribution. For example, execution of the data processing 202, simulation 204, and aggregation 206 processes for an item at a node for a given epoch may constitute a single trace. These processes may be repeated to generate a plurality of traces for the item at the node for the given epoch. Predicted values for the metrics may be aggregated over the plurality of traces to generate statistics, such as mean, standard deviation, or specific quantiles, for provision as output of the simulation system 106.

As described in greater detail with reference to FIG. 3, during the data processing 202, inputs 208 may be received and processed to generate a plurality of action events. The inputs 208 may include domain logic associated with the supply chain, demand predicted for the item at the node provided by the demand forecasting system 108, and one or more policies generated by policy optimization system 110. In some examples, the generated action events may then be merged to form a stream of action events 210.

Additionally, during the data processing 202, options for defining the simulation process may be selected. For example, a number of traces to be performed may be selected. Also, which statistics are to be computed over the traces may be selected. Further, a time span for the simulation (e.g., the number of epochs to be run) may be selected.

As described in greater detail with reference to FIGS. 4-5, the stream of action events 210 formed from the data processing 202 may be applied to a current run-state of the supply chain during the simulation 204 to yield a stream of observation events 212. The current run-state of supply chain may represent inventory for the item across nodes and on-order transfers. In some examples, the stream of observation events 212 may correspond one to one with the stream of action events 210. For example, every action event within the stream of action events 210 may yield a corresponding observation event within the stream of observation events 212. In other examples, one or more of the action events within the stream of action events 210 may not be observable (e.g., may not have a corresponding observation event). If an action event is not observable, the action event may be performed on the run-state of the supply chain, however a decision may be made that no observation event is to be output as part of the stream of observation events 212. In further examples, the simulation 204 may yield an observation event corresponding to an outside cadence rather than an action event that is included in the stream of observation events 212.

As described in greater detail with reference to FIG. 6, the stream of observation events 212 yielded from the simulation 204 may be transformed to generate one or more metrics during the aggregation 206. The transformation performed during the aggregation 206 may be based on requested metrics 214 received as input from a user. Often, the requested metrics 214 are related to inventory and changes thereto over the epoch. Predicted values for the requested metrics 214 may be provided as output 216 of the simulation system 106. The output 216 may be provided periodically (e.g., provided per epoch) or upon demand. In some examples, additional reporting or post-processing logic may be applied to the metrics. Additionally or alternatively, the stream of observation events 212 (e.g., pre-transformation raw data) may be used as inputs in another process or simulation.

Figure 3:
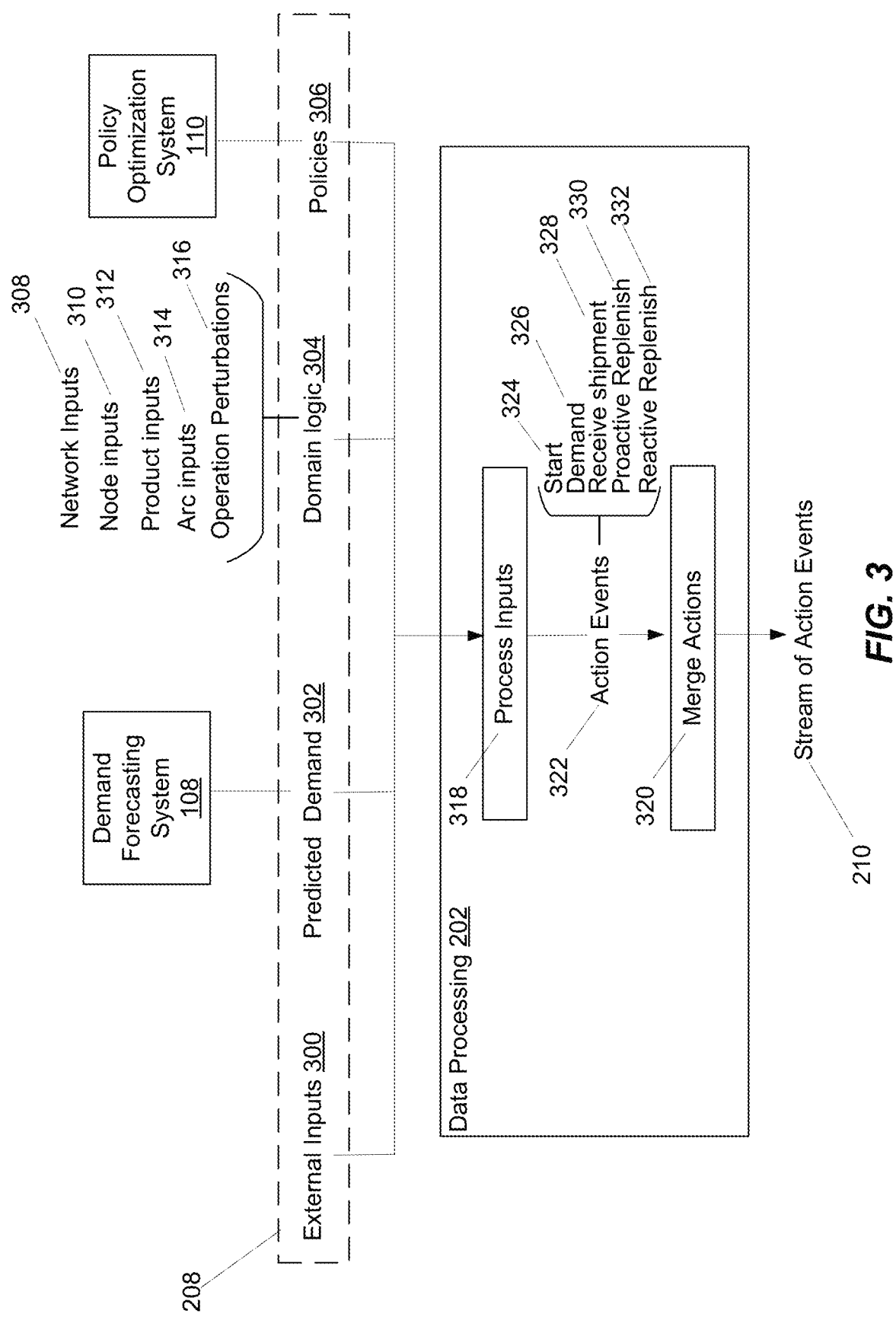
FIG. 3 illustrates example data processing performed by the simulation system.

FIG. 3 illustrates an example of the data processing 202 performed by the simulation system 106. The simulation system 106 may receive a plurality of inputs 208 for a given epoch, where the epoch may be a day. Example inputs 208 may include external inputs 300, predicted demand 302 for the product, domain logic 304 associated with the supply chain, and one or more policies 306.

The external inputs 300 may include known inputs associated with the epoch such as weather, incentive programs, and/or a date, among other examples. The predicted demand 302 for the product may be determined by the demand forecasting system 108. Demand is a quantity of the item that consumers are willing and able to purchase at various prices during a given period of time. A retailer wants to have enough units of the item at a store to satisfy consumer demands. Ordering too many units increases holding costs and the risk of losses due to spoilage or the product becoming outdated or undesirable. Ordering too few of units increases the risk of lost sales and unsatisfied consumers. Thus, when a store sends a transfer order to a distribution center to replenish units of the item at the store, for example, the store may utilize the demand forecasting system 108 to predict demand so that an appropriate number of units are ordered.

Processes that are not fully understood, and whose outcomes cannot be precisely predicted, are often called uncertain or non-deterministic. Additionally, processes that have a range of possible values and have some variation may be referred to as stochastic. Demand is one example. Models explicitly recognizing the stochastic nature of demand may be implemented by the demand forecasting system 108 in order to more accurately predict demand. For example, the predicted demand 302 may be provided as a probability distribution of demand for the product on the given epoch (e.g., a number of products predicted to be purchased on the given day). The day may be defined based on store hours during which purchases can be made, such as from open to close of the store. The demand forecasting system 108 may utilize a variety of data to determine the predicted demand 302. Non-limiting and non-exclusive examples include one or more items sales data (e.g., a number of units of the item sold), price data (e.g., a number of units of the item sold at a particular price, and inventory data (e.g., a number of remaining units of the item), among other similar data.

The demand forecasting system 108 may output the predicted demand 302 at varying levels of granularity. In some examples, the total number of products predicted to be purchased on the particular day may be represented as one event. In other examples, the number of products predicted to be purchased on the particular day may be represented as many events spread out over the day corresponding to times of day likely to be purchased. Whether one event versus many events are output may be a tradeoff between computational cost and accuracy. For example, one event may require less computational processing, and thus cost, but is less accurate. In contrast, many events may require more computational processing, and thus cost, but provides greater accuracy. Thus, often times, whether one event versus many events are output by the demand forecasting system 108 may be based on a use case for the simulation. For example, if the output 216 of the simulation system 106 is being subsequently fed into a purchasing system to determine a number of items that will be withdrawn over time from a distribution center, then representing the predicted demand 302 as one event may be sufficient for yielding information needed as input to the purchasing system (e.g., the additional processing to generate many events is not necessary).

The domain logic 304 may include network inputs 308, node inputs 310, product inputs 312, arc inputs 314, and operation perturbations 316. Example network inputs 308 may include types and locations of nodes and valid edges or arcs between the nodes. A node may be a supplier, a distribution center or a store, among other facilities in the supply chain network, and an edge or an arc may connect two nodes in a direction of the product flow to show a route for transporting the product between the two nodes. Example node inputs 310 may include a throughput capacity (in units) of a node, a storage area capacity by unit type (e.g., pallets, casepacks, eaches), a processing cost per unit, a processing lead time (e.g., a time from start to end of processing), an ordering schedule for supply nodes, and initial inventory.

Example product inputs 312 may include dimensions or volume of an individual unit (e.g., an each) of the product, a number of eaches per case, dimensions or volume of a casepack, a number of cases per pallet, and special attributes of the product. The special attributes of the product may describe a category of the product (e.g., apparel) or properties associated with the product or its packaging (e.g., nonconveyable, flammable, or perishable). Example arc inputs 314 may include dimensions or volume of a load, a transportation cost per load, and a transportation lead time (e.g., a time from start to end of transport).

Example operation perturbations 316 may include disruptions to a normal operation of the supply chain, such as lead time. Lead time may be present at various stages of the supply chain, including item processing at the distribution center, transportation from a distribution center to a store, and/or item processing at the store. Similar to demand, lead time may be uncertain or stochastic. Therefore, a model explicitly recognizing the stochastic nature of lead time may be implemented in order to more accurately predict lead-time related operation perturbations 316 for provision as one of the inputs. For example, a nominal value with an error model may be determined or a nominal value and an actual value may be determined.

The policies 306 may be generated by the policy optimization system 110. The policies 306 may be generated based on a current run-state of the supply chain and one or more business objectives set by the retail enterprise. A policy is a function that returns a decision, given the information about the system. The goal of the policy may be to optimize an objective over time and may make assumptions about demand and lead times. Here, the policies 306 may be associated with replenishment.

One or more of the policies 306 may be evaluated at a single fixed time of day, hereafter referred to as a proactive policy. Similarly, a multi-batch proactive policy may allow for multiple fixed decision times throughout the day. Additionally or alternatively, one or more of the policies 306 may be a reactive policy that is evaluated one or more times a day in response to receiving new information about the current run-state of the supply chain or the one or more business objectives, hereinafter referred to as a reactive policy. Moreover, the policies may include one or both of request and allocation policies, where the request policies may be variants of order-up-to-level (OTL) policies and the allocation policies may be variants of round robin policies.

During the data processing 202, operations 318 and 320 may be performed by the simulation system 106. At operation 318, the inputs 208, including the external inputs 300, the predicted demand 302, the domain logic 304, and the policies 306, may be processed to generate a plurality of action events 322. At operation 320, the generated action events 322 may then be merged to form the stream of action events 210. In some examples, multiplexing techniques may be performed to merge the action events 322 to form the stream of action events 210.

Example action events 322 may include a start action event 324, a demand action event 326, a receive shipment action event 328, a proactive replenish action event 330, and a reactive replenish action event 332. As one example, a truck schedule may be received as one of the inputs 208. The truck schedule may be processed to generate one or more receive shipment action events 328. As another example, the predicted demand 302 may be processed to generate one or more demand action events 326. As a further example, the policies 306 received as one of the inputs 208 may be processed to generate corresponding start action events 324, proactive replenish action events 330, and reactive replenish action events 332.

Figure 4:
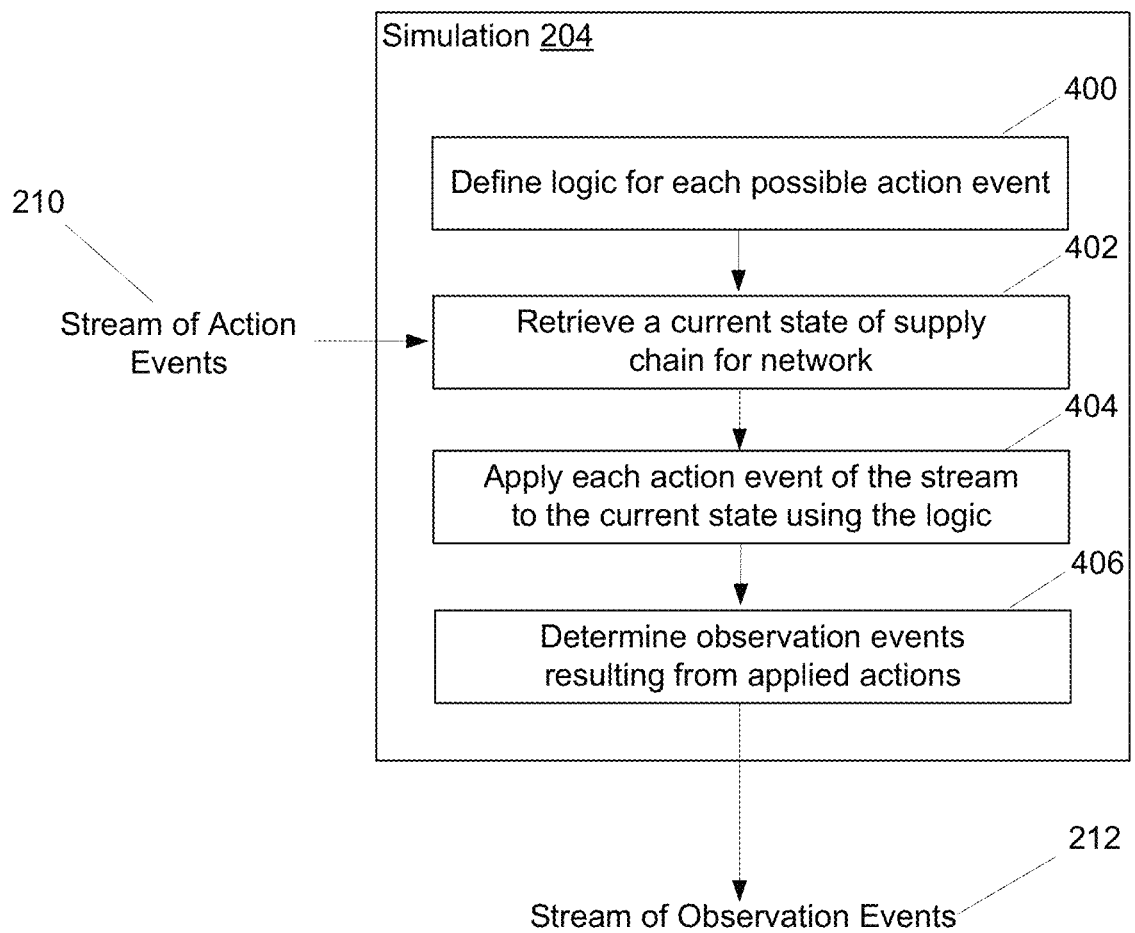
FIG. 4 illustrates an example simulation process performed by the simulation system.

FIG. 4 illustrates an example of the simulation process 204 performed by the simulation system 106. For example, operations 400, 402, 404, and 406 may be performed by the simulation system 106 to yield a stream of observation events 212. At operation 400, logic for each possible action event may be defined. The logic may specify what the simulation system 106 is supposed to do to update a run-state of an enterprise network's supply chain when a particular action event is received. For example, the logic may specify to do "x" to update the run-state when a first type of action event is received, and do "y" to update the state when a second type of action event is received.

In response to receiving the stream of action events 210 output from the data processing 202, a current run-state of the supply chain for the enterprise network may be retrieved at operation 402. Each action event in the stream of action events 210 may be applied to the current run-state retrieved at operation 404 using the logic defined for the respective action at operation 400 (e.g., to update the run-state).

At operation 406, observation events resulting from the applied actions may be determined. Similar to the action events, the observation events may be provided as a stream (e.g., the stream of observation events 212). In some examples, a number of the observation events corresponds to a number of action events 1:1. To provide an example, the first action event in the stream of action events 210 may be a demand action event 326 that indicates 3 units of the item are likely to be sold soon after the node (e.g., a store) opens based on the predicted demand 302. The logic may indicate that the simulation is to create a "sale" observation event for each unit of item at the respective time during the epoch indicated by the demand action event 326, as well as decrement an inventory count by each unit of item sold, in order to update the state when the demand action event 326 is received.

Figure 5A:
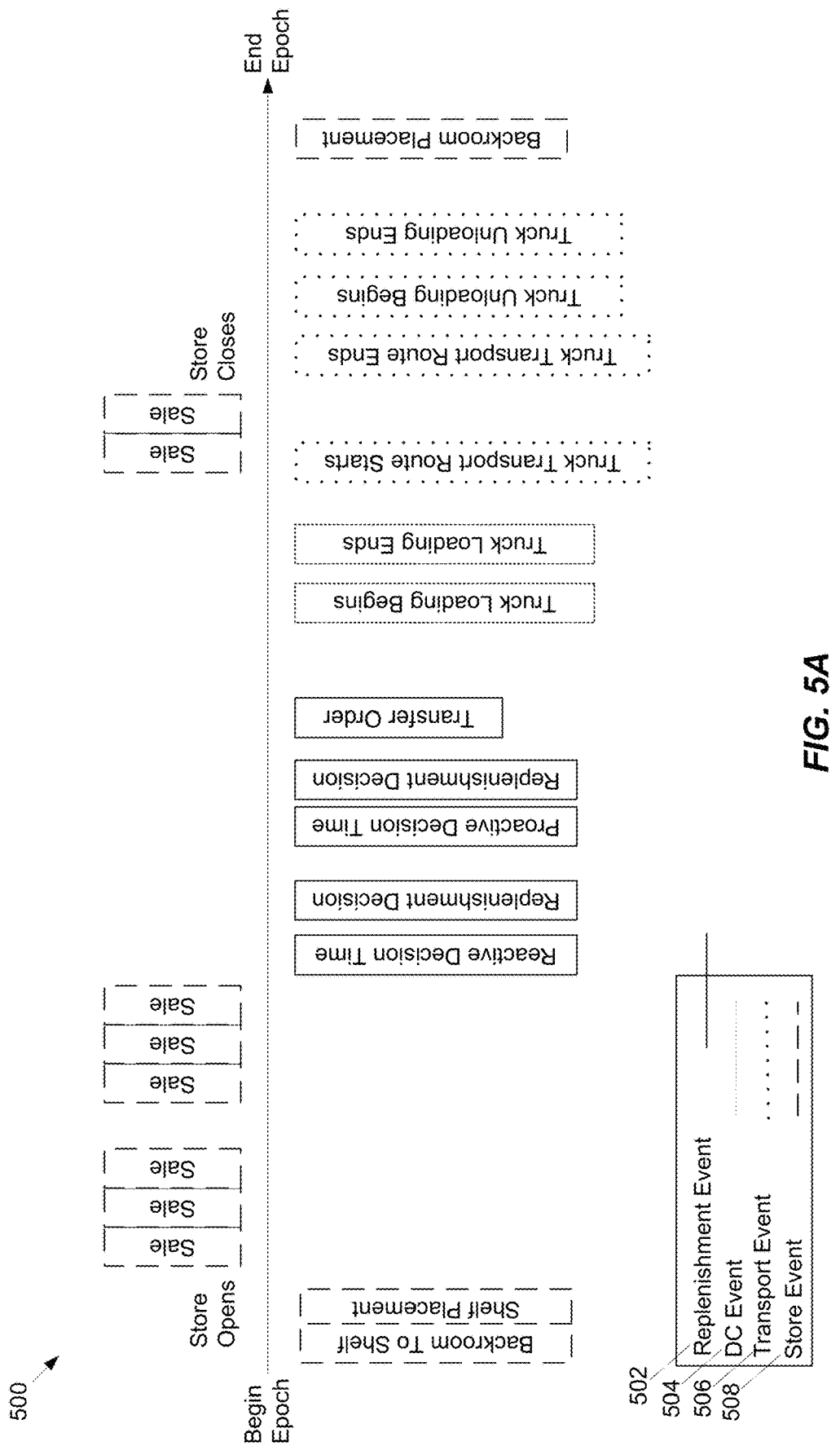
FIG. 5A illustrates an example stream of observation events yielded by the simulation process.
Figure 5B:
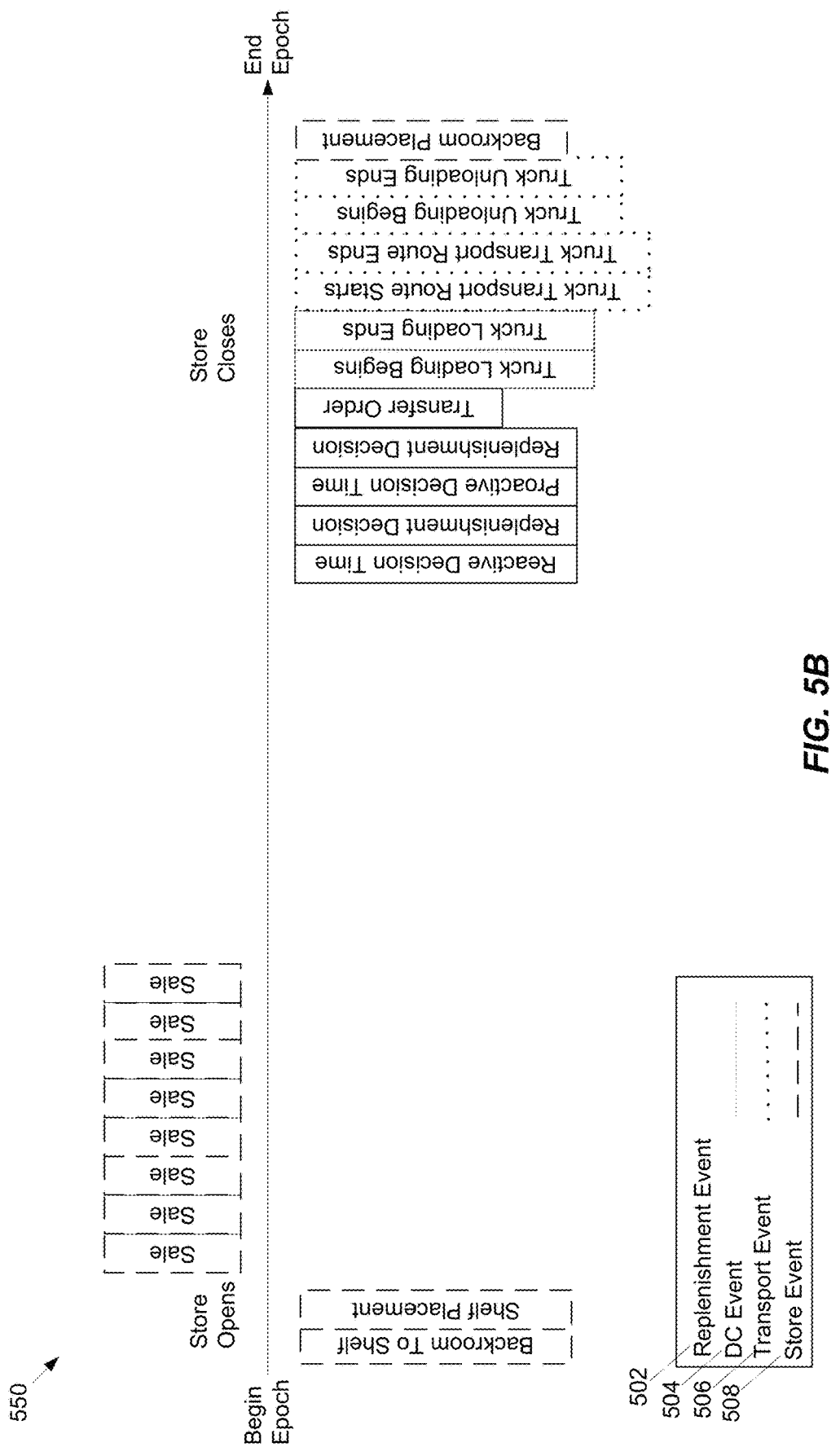
FIG. 5B illustrates a second example stream of observation events yielded by the simulation process.

FIGS. 5A-5B illustrate examples of the stream of observation events 212 yielded by the simulation process 204. In some examples, the stream of observation events 212 is in a form of a timeline 500, as illustrated in FIG. 5A. The timeline 500, displayed along an x-axis, represents an epoch, such as a day from an opening hour of a store at a left most point of the timeline 500 to a closing hour of the store at a right most coordinate of the timeline 500. Display of the timeline 500 along an x-axis is one non-limiting and non-exclusive example. Other displays are possible.

In the example timeline 500, the stream of observation events 212 may include a variety of event types occurring at different points (e.g., nodes or arcs) along the supply chain. For example, a first portion of events may be replenishment events 502. In some examples, the replenishment events 502 may be based on one or more of the policies 306 generated by the policy optimization system 110 that correspond to replenish action events 330, 332 from the stream of action events 210. Some of the replenishment events 502 may be pre-scheduled, proactive events, such as the proactive decision time and subsequent replenishment decision, which correspond to proactive replenish action events 330 based on a proactive policy of the policies 306. For example, the proactive decision time may be a single fixed time of day that the run-state of the supply chain is evaluated based on the proactive policy. The subsequent replenishment decision may be a determined number of units, if any, of the item needed for replenishment at the store based on the evaluation performed at the proactive decision time. This number may be included within the transfer order. Other of the replenishment events 502 may be reactive to other events occurring in the stream of observation events 212, such as the reactive decision time and subsequent replenishment decision, which correspond to reactive replenish action events 332 based on a reactive policy of the policies 306. For example, n items sales events at the store may trigger a reactive decision time, where the run-state of the supply chain may be evaluated. In some examples, n may be a threshold value. The subsequent replenishment decision may be a determined number of units, if any, of the item needed for replenishment at the store based on the evaluation performed at the reactive decision time. This number may be included in the transfer order.

A second portion of events may be distribution center (DC) events 504 occurring at the distribution center from which the store receives the item. In some examples, units of the item are transported via a truck, and the DC events 504 may include a start of a loading of the truck with the item units and an end of the loading of the truck. In other examples, other transportation methods may be used (e.g., aircraft), and similar loading and unloading events may be included.

A third portion of events may be transport events 506 occurring as the item is sent from the distribution center to the store. Example transport events 506 include a start of the transport route, an end of the transport route, a start of an unloading of the truck, and an end of the unloading of the units of the item from the truck. In some examples, one or more of the transport events 506 may correspond to receive shipment action events 328 within the stream of action events 210.

A fourth portion of events may be store events 508 occurring at the store. Example store events 508 include sale of an item, placement of the item on a shelf, placement of the item in the backroom, and movement of the item from the backroom to a shelf. In some examples, one or more of the store events 508 may correspond to demand action events 326 within the stream of action events 210.

In some instances, just as events within a particular epoch are dependent on events occurring within that epoch as well as a current state of the supply chain, events may be based on, or depend from, events occurring in other epochs. For example, in FIG. 5A, a Backroom to Shelf event and a Shelf Placement event (e.g., restocking shelves) are shown as occurring within the given epoch, but may be contingent upon events occurring a prior epoch, such as a trailer arrival and being unloaded into a backroom of a store (e.g., the Truck Transport Route Ends, Truck Unloading Begins, Truck Unloading Ends, and Backroom Placement events as occurring during a preceding epoch).

Referring to FIG. 5A generally, it is noted that in some instances, the simulation systems described herein may be configured such that all events of a given type may be grouped and ordered within an epoch for simplified evaluation. For example, in the timeline 500, all sale events that occur within a particular day will occur at the same time (in this case, once the store opens). However, as noted above, demand for a given product is not only variable in volume for a given day, it is variable in time. For example, a demand input provided may indicate specific times of day (e.g., at a beginning or end of the day) when demand may be higher for a particular item.

It is noted that, even in this case, execution of the simulation 204 may include application of domain logic 304 and/or policies 306 on either a per-epoch basis or in response to each event. Accordingly, action events may be generated in response to all inputs received for a given day, or in response to each individualized input (including input events, logic, etc.) in sequence.

By way of contrast, in a further example timeline 550 seen in FIG. 5B, events may be spread across a given epoch (in the example shown, a day). In this example, sale events are shown as being distributed over the course of the day. The number of sale events in timelines 500, 550 may be the same based on the same demand input, but the sale events in timeline 550 may be placed within the timeline at different locations depending on a desired sales pattern. In one example, the sale events are evenly spread across the portion of the day the store is open. In other examples (such as is shown), the events may be distributed over the course of the day based on a pattern of demand that is provided as an input (e.g., with greater demand early and late in the day for this particular item). Still further, other events, such as distribution center events 504, transport events 506, and/or store events 508 may be generated in response to various logic and/or policies as events occur, in order, during the day.

In comparison of the timelines 500, 550, it is noted that the selection of which manner in which a simulation is executed may have some effect not only on overall computational complexity (e.g., assessing events and item movements once per epoch, rather than in response to each event) but also with respect to accuracy at that particular node in a supply chain and throughout the supply chain. For example, in both example timelines, the same number of sales may occur on a given day. However, because reorder events (e.g., the transfer orders as shown) might occur earlier in the day in the case of timeline 500, the timing of transport of new items may differ, and therefore, a number of stockouts may also differ. At other nodes within a given supply chain simulation, the earlier transfer order received at a distribution center to replenish stock at a store may change logic that is executed for that distribution center (e.g., to reallocate stock of the item differently across all stores). Other variations may occur as well. Accordingly, a user selection to evaluate the simulation on a per-epoch basis or on a per-event basis may result in a tradeoff between accuracy and computational complexity.

Still further, in the context of either timeline of FIGS. 5A-5B, because certain inputs or execution characteristics are non-deterministic but must be selected to be discrete values at the time of simulation, in some example embodiments, each epoch may be configured for execution for a number of iterations. Each iteration may select a particular value independently of other iterations, but within the range of possible values for that particular input or execution parameter. For example, although in both FIGS. 5A-5B, eight sale events are shown for a particular item in a given day (the selected epoch), an input may reflect a demand distribution in which a range of items may be sold (e.g., 8+/−2 sales, with sales being more likely in morning and evening hours). Accordingly, if a plurality of iterations of a given epoch are executed, varying numbers of sales may be used in the different iterations (e.g., values in the range of six to ten sales, weighted toward a most-likely value, and distributed within a given timeline 500 at a most likely time of day).

Accordingly, and given the variety of types of configurations that are provided by the simulation system described herein, prior to execution of a simulation, a user may select the granularity of simulation events that are used in a given execution, a number of epochs for the simulation, a specific product or products associated with the simulation, as well as a number of iterations of the same epoch that is simulated to obtain a range of simulated results that corresponds to the range of non-deterministic inputs and simulation characteristics.

Figure 6:
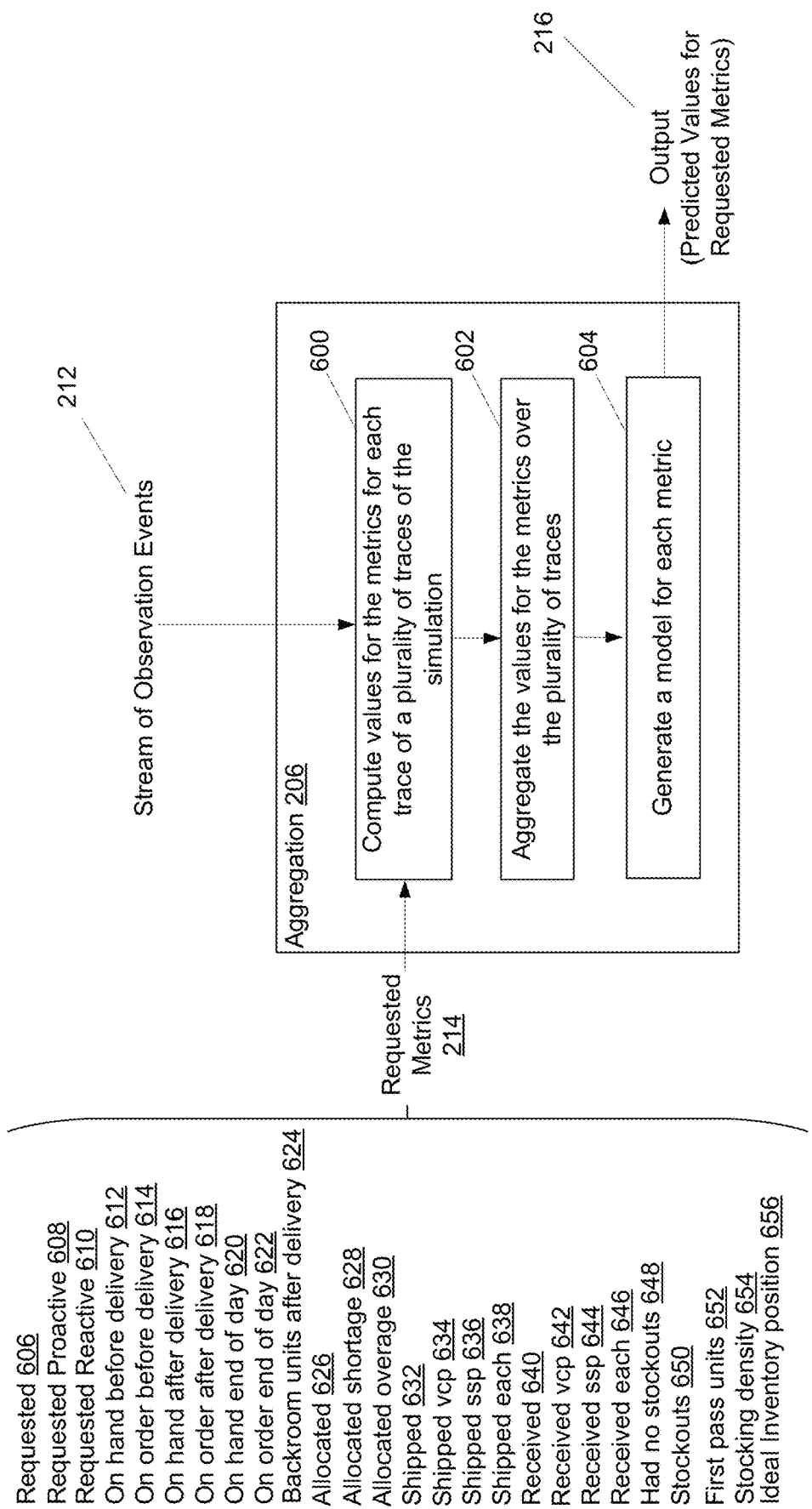
FIG. 6 illustrates an example aggregation process performed by the simulation system.

FIG. 6 illustrates an example of the aggregation process 206 performed by the simulation system 106, useable after events are generated from the simulation process 204. One or more requested metrics 214 and the stream of observation events 212 yielded from the simulation process 204 may be received as input. During the aggregation process 206, operations 600, 602, and 604 may be performed by the simulation system 106 to transform the stream of observation events 212 to determine predicted values corresponding to the requested metrics 214 for provision as output 216.

In some examples, the stream of observation events 212 output from the simulation process 204 may represent a single trace of a plurality of traces run by the simulation. To transform the stream of observation events 212, values for the requested metrics 214 may be computed for the trace based on an analysis of events within the stream of observation events 212 at operation 600. This transformation is repeated for each trace of the plurality of traces, and at operation 602, the values for the requested metrics 214 computed for each trace may be aggregated over the plurality of traces. This may occur over multiple iterations within the same epoch, or over a plurality of epochs, or both, depending on the configuration of the simulation executed.

At operation 604, a model may be generated for each of the requested metrics 214 based on the aggregation performed at operation 604. The model generated is a statistical model including univariate statistics, such as a mean value for the metric, a standard deviation value for the metric, a minimum value for the metric, and a maximum value for the metric across the plurality of traces, and samples. The samples may include a list of values for the metric in the first n traces that were run. In one example, n may be three traces. The list of values may correspond across the requested metrics 214. For some types of simulation, such as a first mile simulation, a complete model may not be generated. Based on the nature of the model, numerical values corresponding to the requested metrics 214 that are provided as the output 216 can be univariate statistics.

The requested metrics 214 may be related to inventory and changes thereto over an epoch, or over a plurality of epochs (or an average per-epoch value across a plurality of epochs). For example, the requested metrics 214 can include one or more of the following metrics, each described in turn below: requested 606, requested proactive 608, requested reactive 610, on hand before delivery 612, on order before delivery 614, on hand after delivery 616, on order after delivery 618, on hand end of day 620, on order end of day 622, backroom units after delivery 624, allocated 626, allocated shortage 628, allocated overage 630, shipped 632, shipped vcp 634, shipped ssp 636, shipped each 638, received 640, received vcp 642, received ssp 644, received each 646, had no stockouts 648, stockouts 650, first pass units 652, stocking density 654, and ideal inventory position 656. "Need" as used throughout the following descriptions of the requested metrics 214 means a number of units a node needs to bring inventory level of the product up to meet the order-to-level (OTL), where OTL is a number of units that should be on hand at a node at a beginning of an epoch. For purposes of the following descriptions, an epoch is defined as a day.

Requested 606 represents a number of units that were requested of the node. If the node is a distribution center, requested 606 may represent a total need from all children nodes for that particular day (e.g., a number of units needed to bring inventory level of the product up to meet the OTL for all stores that receive the product from the distribution center). If the node is a store, requested 606 may represent a total sales demand for that particular day at the store. To provide an example, a network may have one distribution center with three stores. Each of the three stores has an OTL of 4 units and currently has 2 units on hand, and thus each of the three stores needs 2 units to meet the OTL. Simulated sales demand at each store is 2 units. Therefore, for the one distribution center, requested 606 is 6 (need=2+2+2), and for each of three stores, requested 606 is 2 (sales demand=2).

Requested proactive 608 represents a number of units that were requested of the node during a proactive policy evaluation before any sales or item movements occur (e.g., at start of an epoch, such as beginning of the day). If the node is a distribution center, the requested proactive 608 may be the sum of all children nodes' need from proactive policy evaluation (e.g., a number of units needed to bring inventory level of the product up to meet the OTL for all stores that receive the product from the distribution center at the beginning of the day). Stores may not undergo a proactive policy evaluation, and thus if the node is a store, the value for requested proactive 608 may be 0 units. To provide an example, if the proactive policy evaluation at start of an epoch generates a need of 4 units for a sole child store of a distribution center, the requested proactive 608 will be 4 units for the distribution center and 0 units for the store.

Requested reactive 610 represents a total need generated from policy evaluations as item sales occur throughout the epoch for a node's children. In some examples, if the node is a distribution center, only certain types of distribution centers, such as flow center nodes with a reactive replenishment flag in an associated configuration file may have a value for this metric. Otherwise, distribution centers may have a value of 0 units for the requested reactive 610. If the distribution center does have a value for this metric, the sum of values for the requested proactive 608 and the requested reactive 610 may equal the value for requested 606. If the node is a store, the requested reactive 610 may be a number of units to replenish units of the item that are sold at the store throughout the epoch (e.g., a one-for-one replenishment of item units sold at the store throughout the day). However, for stores, because value for the requested proactive 608 is 0 units, the values of the requested 606 and the requested reactive 610 are equal. To provide an example scenario, a child store is replenished reactively by its parent flow center. The flow center has 2 units on hand, the store has an OTL of 10 units, and 4 units on hand. Therefore, during a proactive replenishment, the store requests 6 units, but only 2 units are allocated such that the store now has 6 units on hand. Now, the store sells 1 unit throughout the day and therefore has 5 units on hand during reactive evaluation. The requested reactive 610 is then (5−(6−2))=1, so only 1 unit is requested specifically due to reactive replenishment.

On hand before delivery 612 represents a total number of item units on hand at the node at the start of the day, before any demand (e.g., sales) and before any deliveries has occurred. On order before delivery 614 represents a total number of item units on order for the node at the start of the day, before any demand (e.g., sales) and before any deliveries has occurred. On hand after delivery 616 represents a total number of item units on hand at the node after delivery. On order after delivery 618 represents a total number of item units on order for the node at the node after delivery. In some examples, if there is only one truck delivery during the day, then the summation of on hand before delivery 612 and on order before delivery 614 equals the summation of on hand after delivery 616 and on order after delivery 618 (e.g., because on order after delivery 618 is 0 units as there is only one truck delivery for the day).

On hand end of day 620 represents a total number of item units on hand at the node at the end of the day, after the demand for the day is done (e.g., after store has closed and no more items can be sold) and after deliveries have likely arrived. If there are no further deliveries received, and thus no overnight changes from the end of the day to a next day, then the on hand end of day 620 for the day is equal to the on hand before delivery 612 for the next day.

On order end of day 622 represents a total number of item units on order for the node at the end of the day, after the demand for the day is done (e.g., after store has closed and no more items can be sold) and after deliveries have likely arrived. If there are no further deliveries received, and thus no overnight changes from the end of the day to a next day, then the on order end of day 622 for the day is equal to the on order before delivery 614 for the next day.

Backroom units after delivery 624 represent a maximum number of units over the course of the day that did not fit on the shelf at the store. Based on the shelf capacity (e.g., a number of units that can fit on the shelf at one time) and assuming one delivery occurs at the beginning of the day, the backroom units after delivery 624 is equal to max(0, x), where x is the difference between on hand after delivery 616 and the shelf capacity. Items that do not have shelf capacity defined (e.g., non-POG items) are treated as always fitting on the shelf, and thus the value for backroom units after delivery 624 is 0 units. Similarly, if the node is a distribution center, rather than a store, than the value for the backroom units after delivery 624 is 0 units.

Allocated 626 represents a total number of units allocated at a distribution center. Thus, if the node is a store, the value may be 0 units. Assuming daily shipments and all units fit on a truck, the values for allocated 626 and shipped 632 are equal. Allocated shortage 628 represents a total number of units allocated at a distribution center during shortage allocation, which may be defined by a difference between the values for requested 606 and unfilled demand described below. Allocated overage 630 represents a total number of units allocated at a distribution center during overage allocation. The summation of values for allocated shortage 628 and allocated overage 630 yield the value for allocated 626.

Shipped 632 represents a total number of units that are shipped from a node. If the node is a distribution center, shipped 632 includes that total number of units shipped from the distribution center to children stores. To provide an example, if the distribution center ships 10 units to various stores during a day, then the value for shipped 632 is 10 units for the day. If the node is a store, shipped 632 is the fulfilled sales demand (e.g., a total number of units sold at the store for the day).

Shipped vcp 634 represents a number of vendor case packs (VCPs) shipped from a node, particularly a distribution center. To provide an example, if the vendor case pack size is 6 (e.g., 6 units of the item are included within 1 pack), and value for shipped 632 is 13 units then shipped vcp is 2 VCPs. In other words, 2 VCPs are shipped from the distribution center. Stores do not sell in VCPs, rather individual units of the item, so if the node is a store, then the value for shipped vcp 634 may be 0. Shipped ssp 636 represents a number of store ship packs (SSPs) shipped from a node, particularly a distribution center. Stores do not sell in SSPs, rather individual units of the item, so if the node is a store, then the value for shipped ssp 636 may be 0. Shipped each 638 represented a number of eaches (e.g., a number of individual units of the item) shipped from the node. If the node is a store, values for shipped each 638 and shipped 632 are equal. If the node if a store, values for shipped each 638 are a number of VCPs or a number SSPs multiplied by the number of units within each VCP or SSP, respectively.

Received 640 represents a total number of units that a child node (e.g., a store) receives on an epoch from their parent node (e.g., a distribution center) that was shipped a lead time earlier. For example, if the distribution center has a lead time of one day to ship an item to its child store, and it ships 10 units on day 1, then the store will have received 10 units on day 2. Thus, a summation of values for received 640 for each child node on a day plus lead time equals a value of shipped 632 for the parent node on the day. Additionally, if there is only one truck delivery in the morning, then the value of on hand after delivery 616 equals a summation of values for on hand before delivery 612 and received 640. Additionally, the value of on order after delivery 618 equals a difference between on order before delivery 614 and received 640.

Received vcp 642 represents a number of VCPs received at a node. Received ssp 644 represents a number of SSPs received at a node. Received each 646 represents a number of individual units of items received at a node. Determining received vcp 642, received ssp 644, and received each 646 is analogous to determining shipped vcp 634, shipped ssp 636, and shipped each 638, respectively.

Had no stockouts 648 is a metric that represents the probability of covering all demand in a given epoch, and is a boolean value of 0 or 1. A value of 0 signifies that 100% of the demand (e.g., a value for requested 606) is likely to be satisfied based on the number of units on hand. A value of 1 represents an observation where a number of units was not greater than or equal to the demand (e.g., the value for requested 606), and thus there is unfulfilled demand.

Stockouts 650 is a metric that represents whether there was a stockout of the item in a given epoch, and is a boolean value of 0 or 1. A value of 0 indicates there was not a stockout, where a value of 1 indicates there was a stockout. A stockout occurs when the number of units on hand for an item is less than or equal to 0 units. Presence or absence of a stockout signifies whether the node had enough units on hand to cover potential demand.

By determining stockouts 650 across all eligible nodes for an item, a user can calculate a type 1 service level (e.g., an out-of-stock percentage (OOS %)), by taking the mean of stockouts 650 for all nodes an item is eligible in. To provide an example, an item may be eligible in 3 nodes, each having three traces run by the simulation. The stockouts 650 for each node and trace are shown in the table below, along with a trace mean (e.g., a mean of stockouts for each trace across all three nodes) and a node mean (e.g., a mean of stockouts 650 for each node across all three traces). The node mean is also referred to as a stockouts mean.

| Node | Trace 1 | Trace 2 | Trace 3 | Node Mean |
|---|---|---|---|---|
| 2223 | 0 | 1 | 0 | 0.333 |
| 3204 | 0 | 0 | 1 | 0.333 |
| 3 | 1 | 1 | 1 | 1.0 |
| Trace Mean | 0.333 | 0.666 | 0.666 | |

To calculate OOS % for an item across all nodes, the stockouts mean is aggregated at the item-date level across the nodes, and a mean is calculated from the aggregated date. This mean value represents the percentage of nodes in which this item was out-of-stock. Utilizing the data from the table per the example above, this would give an OOS %=(0.333+0.333+1.0)/3=0.555 for this item; which signifies that 55% of the nodes for this item had a number of units on hand less than or equal to 0 for the given epoch.

First pass units 652 represents a number of units delivered to a node, particularly a store, that are immediately put on the shelf. To provide an example, if the number of units on hand before delivery is 3, and 5 units are received, but the shelf capacity is only 6, then first pass units 652 would be 3 (e.g., first pass units 652=min(max(0, shelf capacity−on hand before delivery 612), received 630)). Items that do not have shelf capacity defined (e.g., non-POG items) are treated as always fitting on the shelf, and a value for first pass units 652 for such items is equal to a value for received 640. If the node is a distribution center the value for first pass units 652 may be 0 units. A summation of the values for first pass units 652 and backroom units after delivery 624 may equal a value for received 640.

Stocking density 654 is a metric similar to first pass units 652, however statistics are only collected when the value is non-zero. In other words, days when there are no deliveries do not affect the mean, standard deviation, etc. of the calculation.

Ideal inventory position 656 represents an inventory (e.g., a number of units of an item) that a node needs to have on hand in order to fulfill all requests (e.g., demand) until the next order that it can make arrives. The ideal inventory position 656 may be particularly helpful to determine on order days. To provide an example, if the order day is Monday, the next order day is Wednesday, and the lead time is two days meaning that the next order placed on Wednesday would arrive on Friday, then the ideal inventory position 656 is a sum of all the requests that are going to happen (e.g., the sum of all demand) between Tuesday and Thursday, assuming that the order is received on Friday before demand occurs, and Monday is skipped because ordering happens at end of day.

In some examples, the requested metrics 214 received as input may be based on a type of the simulation being run. For example, if the simulation is a first mile simulation (e.g., a pre-optimization simulation), the requested metrics 214 received as input may include one or more of requested 606, on hand before delivery 612, shipped 632, received 640, stockouts 650, and ideal inventory position 656.

In other examples, the requested metrics 214 received as input may be based on a subsequent process for which the output 216 (e.g., predicted values for the requested metrics 214) is to be provided as input. As one example, the output 216 may be utilized to facilitate sales and operations planning (S&OP) volume predictions. These volume predictions may facilitate labor planning such as a how many employees are needed to work on a particular day at a particular node. Examples of the requested metrics 214 received as input when the output 216 is facilitating S&OP volume predictions may include requested 606, requested proactive 608, requested reactive 610, on hand before delivery 612, shipped 632, received 640, and stockouts 650.

As an additional example, the output 216 may be utilized to facilitate analysis and validation of optimization processes. For example, the policies received as input to the simulation system may be frequently updated by the policy optimization system to adjust existing policies and/or add new policies. The output 216 may be used to determine whether the policies should be rolled back to the former state (e.g., prior to the last update). Examples of the requested metrics 214 received as input when the output 216 is facilitating analysis and validation of optimization processes may include all of the above-described metrics except ideal inventory position 656.

As a further example, at least some portions of the output 216 (e.g., some of the values for the requested metrics 214) may be utilized post processing to compute additional metrics not directly output by the simulation system 106. For example, a fill rate or a type 2 service level (e.g., unfilled demand) for a node can be determined based on a difference between values for requested 606 and shipped 632 metrics that are output by the simulation system 106. If the node is a store, the unfilled demand may be a total number of units of missed demand. If the node is a distribution center, the unfilled demand may be a number of units requested of the distribution center that could not be fulfilled due to sufficient inventory.

The example requested metrics 214 described above are non-limiting and non-exhaustive examples. Other types of metrics related to inventory and how inventory changes over time may be included within the requested metrics 214.

The data processing 202, simulation 204, and aggregation 206 processes as described in detail with reference to FIG. 3, FIG. 4 and FIG. 6, respectively, are performed on a per epoch basis to predict values for requested metrics for the respective epoch with regard to a single item at a single node of the network. The data processing 202, simulation 204, and aggregation 206 processes may be repeated for a plurality of epochs with regard to the same item at the same node of the network, resulting in predicted values for requested metrics for the plurality of epochs. Additionally, the data processing 202, simulation 204, and aggregation 206 processes may be repeated for each of a plurality of items at the same node for the plurality of epochs, and for each of a plurality of nodes of the network. Resultantly, a future-state of the supply chain may be generated that represents the plurality of nodes of the network and the plurality of items at each node for the plurality of epochs. The future-state of the supply chain may be analyzed or otherwise implemented to facilitate supply chain management decisions. In some examples, to enable easier user consumption of the future-state of the supply chain during analysis, the predicted values may be provided for display at various levels of granularity allowing a user to select which item and node(s) to display, as described in greater detail below with reference to FIG. 7.

Figure 7:
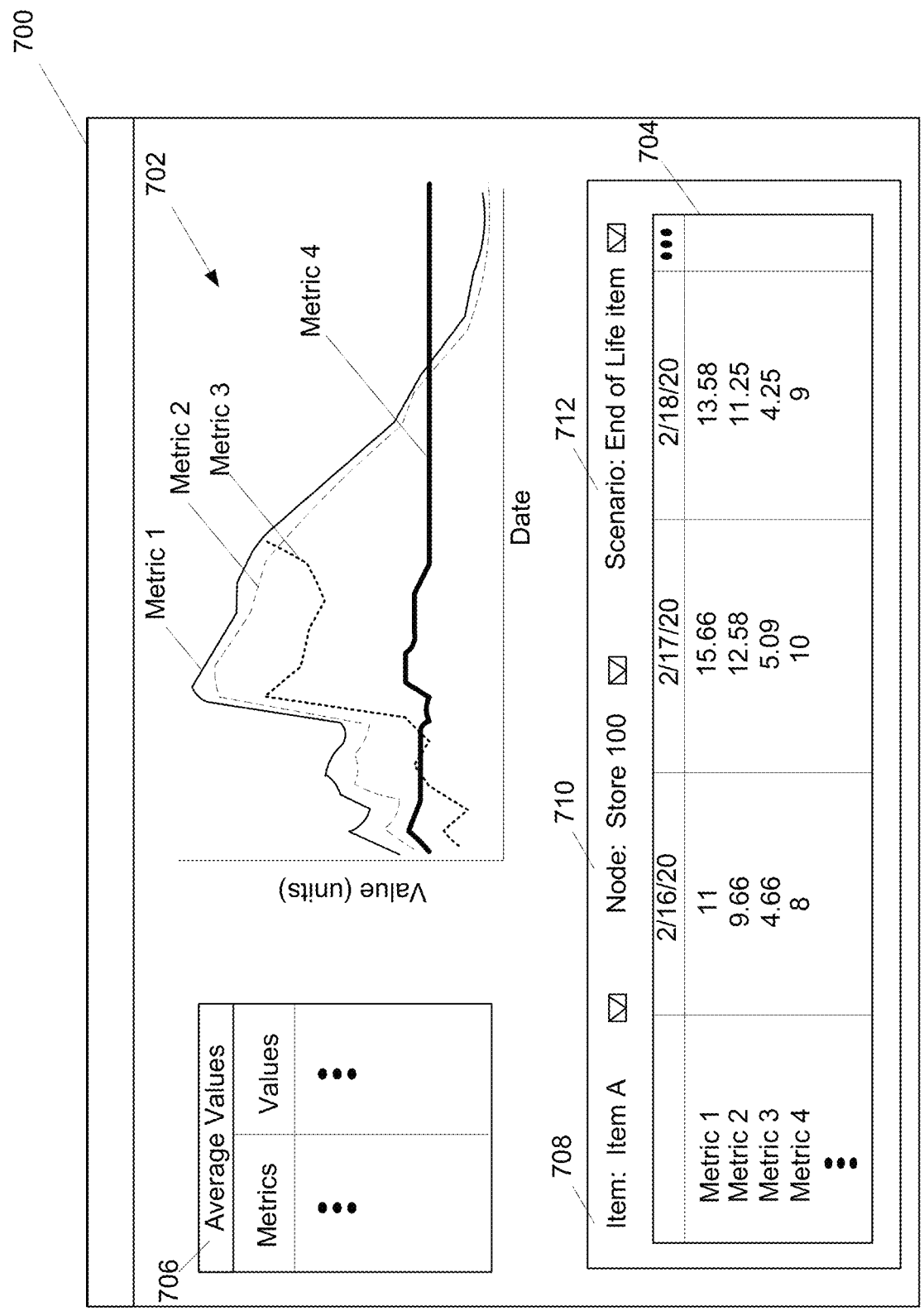
FIG. 7 illustrates an example user interface for displaying output of the simulation system.

FIG. 7 illustrates an example user interface 700 for displaying the output of the simulation system 106. As described in detail with respect to FIG. 6, the output 216 are predicted values corresponding to the requested metrics 214. Additional values not directly output by the aggregation process 206, but computed post-processing may also be displayed.

The user interface 700 may include a graphical view 702 and a tabular view 704 for displaying the metrics and values thereof over a plurality of epochs. In some examples, the values may be one or more of the univariate statistics from the models generated at operation 604 of the aggregation process 206, as described with reference to FIG. 6. Additionally, the user interface may include a list 706 of average values for the metrics across the plurality of epochs.

A user is enabled to manipulate the data displayed by the user interface 700 in each of the graphical view 702, tabular view 704, and list 706 by selecting at least an item 708 and a node 710 (e.g., a store or a distribution center). In further examples, the user may also select a scenario 712, such as end of life item, chronic overstock, large or very large units of merchandise, persistent backroom, among other similar scenarios. In some examples, a drop down menu comprising options may be provided to facilitate user selection.

Based on the item 708, node 710, and scenario 712 selected, corresponding output 216 (e.g., predicted values corresponding to metrics for the particular item at the particular node) may be displayed within the graphical view 702, tabular view 704, and list 706. As illustrated, the user may select item A at store 100, indicating item A is an end of life item (e.g., a clearance item).

The tabular view 704 may be comprised of a plurality of columns and a plurality of rows that intersect to form a plurality of cells. The columns may correspond to the plurality of epochs simulated. Here, an epoch is a day, and thus the columns correspond to dates in the future. The rows may correspond to metrics (e.g., each metric from the requested metrics 214). Each cell may be populated with a predicted value of the metric associated with the row on the date associated with the column. For simplicity, as illustrated in FIG. 7, predicted values of four metrics are displayed for four future days with regard to item A at store 100. However, predicted values of each metric of the requested metrics 214 may be displayed for tens to hundreds of future days.

The graphical view 702 uses the populated data from the tabular view 704 to visually display the predicted values. For example, an x-axis of the graphical view 702 may represent dates (e.g., the range of dates spanning into the future). A y-axis of the graphical view 702 may represent a value for the metric measured in units of the item. As illustrated, each of the metrics can be visually displayed in a single, consolidated graphical view 702. In some examples, the graphical view 702 may include a secondary y-axis, depending on values of the metrics displayed. For example, for some of the metrics, values between 0 and 1 may be common, whereas for other metrics values are much greater (e.g., from 5 up to 35). Therefore, to effectively visualize all values within the single, consolidated graphical view 702, two y-axes with varying scales may be utilized.

As previously discussed, in addition to displaying the output 216 of the simulation system 106, additional values computed post-processing based on the output 216 may also be displayed. To provide one non-limiting and non-exclusive example, values for a first metric (e.g., Metric 1) and values for a second metric (e.g., Metric 2) may be produced as part of the output 216. The first metric may be on hand after delivery 616 that represents a total number of item A units on hand at the store 100 after delivery. The second metric may be on hand end of day 620 that represents a total number of item A units on hand at the store 100 at the end of the day, after the demand for the day is done (e.g., after store 100 has closed and no more item A units can be sold) and after deliveries have likely arrived. A third metric (e.g., Metric 3) may be computed post processing based on the output 216 (e.g., based on the first and second metrics, as well as other metrics such as demand). For example, the third metric may represent a worst-case scenario for the on hand end of day based on demand. In other words, the third metric may represent the lowest number of units of item A expected to be on hand at the store 100 at the end of day given a highest possible demand (e.g., highest number of sales) following delivery.

The examples provided in FIGS. 1 through 7 are illustrated with specific systems, devices, processes, and user interfaces. Embodiments are not limited to environments according to these examples. Similar simulation for supply chain replenishment may be implemented in environments employing fewer or additional systems, devices, processes, and user interfaces. Furthermore, the example systems, devices, processes, and user interfaces shown in FIGS. 1 through 7 may be implemented in a similar manner with other values using the principles described herein.

Figure 8:
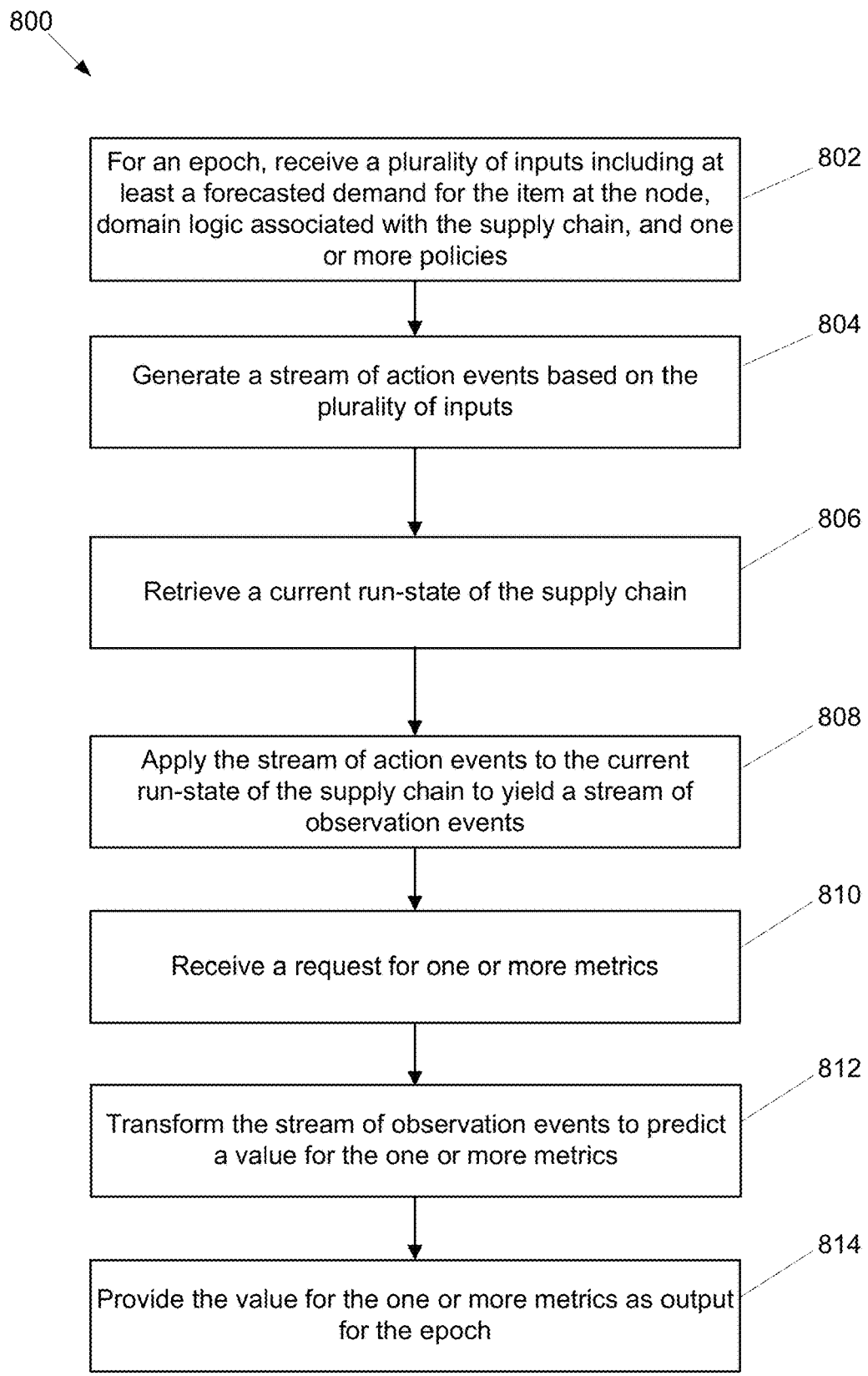
FIG. 8 illustrates an example method for simulating supply chain replenishment.

FIG. 8 illustrates an example method 800 for simulating a per epoch run-state of a supply chain for an item at a node of a network. In some examples, the method 800 may be performed by the simulation system 106 described in detail with reference to FIG. 1.

The method 800 begins at operation 802, where for an epoch, a plurality of inputs may be received. In some examples, the epoch may be a day that has not yet occurred (e.g., day in the future), where the day may be particularly defined by open to close hours of the node. The plurality of inputs may include at least a forecasted demand (or demand distribution) for the item at the node, a domain logic associated with the supply chain, and one or more policies. The plurality of inputs may also include known, external inputs, such as weather, incentive programs, and the date corresponding to the epoch.

At operation 804, a stream of action events may be generated based on the plurality of inputs. For example, a plurality of action events may be determined based on the plurality of inputs, and the plurality of action events may be merged (e.g., using multiplexing techniques) to generate the stream of action events. At operation 806, a current run-state of the supply chain may be retrieved.

At operation 808, the stream of action events generated at operation 804 may be applied to the current run-state of the supply chain retrieved at operation 806 to yield a stream of observation events. For example, prior to or in conjunction with the generation of the stream of action events, logic for updating a run-state of the supply chain may be determined for each possible type of action event based on the respective action event. Therefore, when the stream of action events are generated, a type of each action event within the stream of action events may be determined and respective logic for each action event within the stream of action events may be applied to the current run-state of the supply chain.

At operation 810, a request may be received for one or more metrics. In some examples, the requested metrics may be based on a type of simulation being run and/or a subsequent process to which values of the requested metrics are provided as input. A non-exhaustive and non-exclusive list of example metrics are described in detail with reference to FIG. 6.

At operation 812, the stream of observation events yielded by operation 808 may be transformed to predict a value for the one or more metrics. In some examples, the transformation includes generating a model for each of the one or more metrics. Some of the inputs received at operation 802, such as forecasted demand and certain aspects of the supply chain domain logic (e.g., lead times), represent random processes that are sources of uncertainty in predicting values for the metrics. Therefore, to better assess and remove uncertainty, a plurality of traces may be produced (e.g., by repeatedly running operations 802, 804, 806, and 808). A model for a respective metric may be generated based on values for the respective metric computed over the plurality of traces. For example, a value for the metric is predicted for each trace, values of the metric for each of the plurality of traces are aggregated, and the model is generated based on the aggregation.

At operation 814, the predicted value for the one or more metrics may be provided as output for the epoch. In some examples, the output is provided for display in one or more of a graphical and tabular format. In other examples, the output is provided as at least a portion of a report.

In example embodiments, portions of the method may be performed iteratively to accommodate non-deterministic or stochastic inputs or execution characteristics of the simulation model. For example, operations 802-808 may be performed a user-selectable or predetermined number of times per epoch, with different discrete values selected for each non-deterministic value in each iteration. In some examples, up to one hundred or more iterations may be performed to obtain statistically representative metrics.

In some examples, operations 802 to 814 may be performed for each of a plurality of epochs, resulting in predicted values for the one or more metrics for the plurality of epochs. As one example, the operations 802 to 814 may be performed for the next 105 days. Additionally, operations 802 to 814 may be performed for each of a plurality of items at the node for the plurality of epochs, and for each of a plurality of nodes of the network. Resultantly, a future-state of the supply chain may be generated that represents the plurality of nodes of the network and the plurality of items at each node for the plurality of epochs. The future-state of the supply chain may be analyzed or otherwise implemented to facilitate supply chain management decisions.

The operations 802 to 814 are included for illustration purposes. Event-based simulations for supply chain replenishment may be implemented by similar processes with fewer or additional operations, as well as in different order of operations using the principles described herein. The operations described herein may be executed by one or more processors operated on one or more computing devices, one or more processor cores, and/or specialized processing devices, among other examples.

Figure 9:
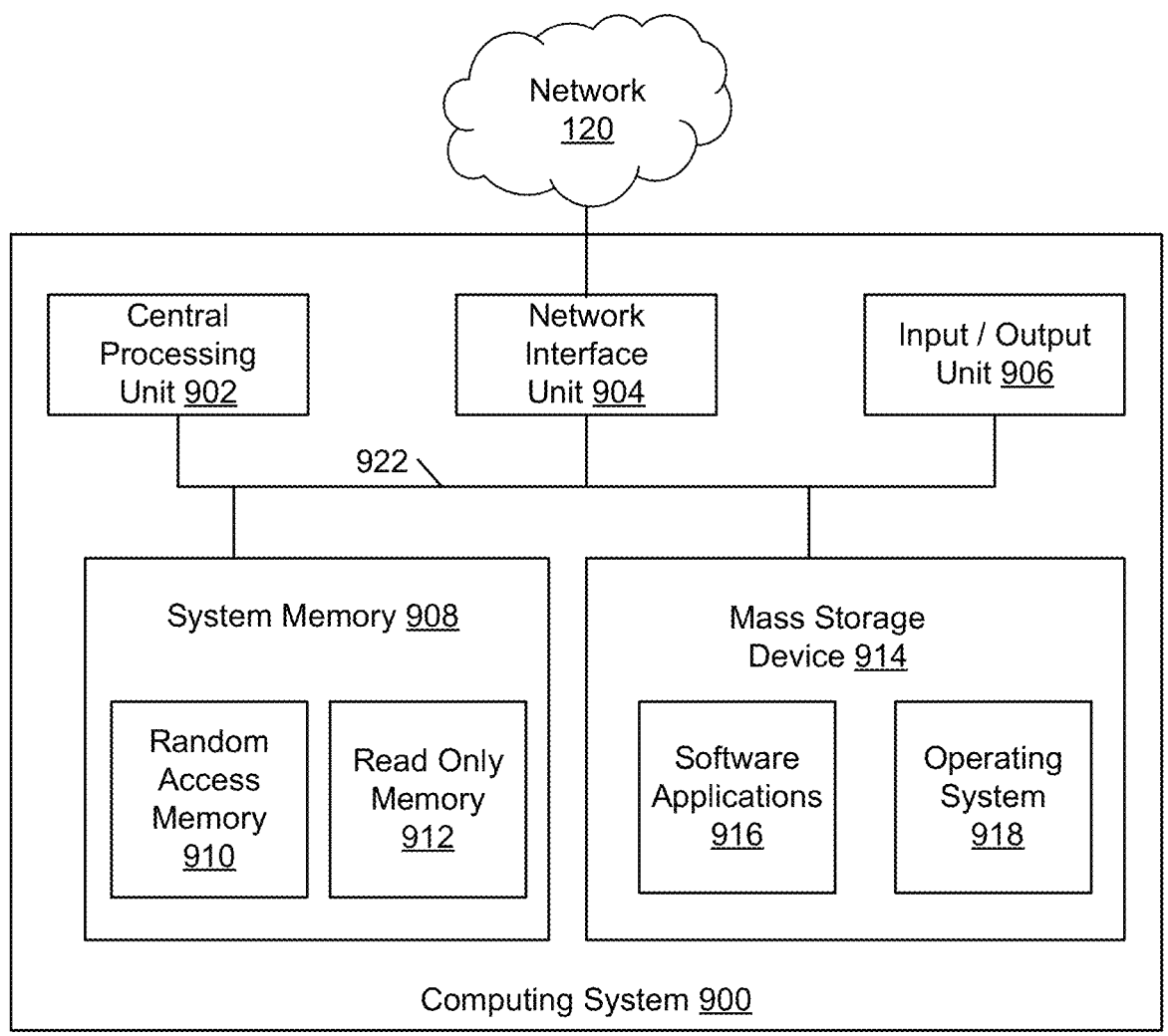
FIG. 9 illustrates an example block diagram of a computing system.

FIG. 9 illustrates an example block diagram of a computing system 900. One or more aspects of the computing system 900 can be used to implement the service 102 and the simulation system 106 as described in greater detail with reference to FIG. 1.

In the embodiment shown, the computing system 900 includes at least one CPU (Central Processing Unit) 902, a system memory 908, and a system bus 922 that couples the system memory 908 to the CPU 902. The system memory 908 includes RAM (Random Access Memory) 910 and ROM (Read-Only Memory) 912. A basic input/output system that contains the basic routines that help to transfer information between elements within the computing system 900, such as during startup, is stored in the ROM 912. The computing system 900 further includes a mass storage device 914. The mass storage device 914 is able to store software instructions and data. In many examples, the one or more processors 104 are each implemented as the at least one CPU 902.

The mass storage device 914 is connected to the CPU 902 through a mass storage controller (not shown) connected to the system bus 922. The mass storage device 914 and its associated computer-readable data storage media provide non-volatile, non-transitory storage for the computing system 900. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 900.

According to various embodiments of the invention, the computing system 900 may operate in a networked environment using logical connections to remote network devices through the network 120. The computing system 900 may connect to the network 120 through a network interface unit 904 connected to the system bus 922. It should be appreciated that the network interface unit 904 may also be utilized to connect to other types of networks and remote computing systems. The computing system 900 also includes an input/output unit 906 for receiving and processing input from a number of other devices, including a touch user interface display screen, or another type of input device. Similarly, the input/output unit 906 may provide output to a touch user interface display screen or other type of output device.

As mentioned briefly above, the mass storage device 914 and the RAM 910 of the computing system 900 can store software instructions and data. The software instructions include an operating system 918 suitable for controlling the operation of the computing system 900. The mass storage device 914 and/or the RAM 910 also store software instructions, that when executed by the CPU 902, cause one or more of the systems, devices, or components described herein to provide functionality described herein. For example, the mass storage device 914 and/or the RAM 910 can store software instructions that, when executed by the CPU 902, cause the computing system 900 to receive and execute processes for simulating supply chain replenishment.

Referring to FIGS. 1-9 generally, and according to some examples, methods for simulating a per epoch run-state of a supply chain for an item at a node of a network are described. In an example method, for an epoch, a plurality of inputs are received. The plurality of the inputs may include at least a forecasted demand for the item, domain logic associated with the supply chain, and one or more policies. A stream of action events based on the plurality of inputs may be generated, a current run-state of the supply chain may be retrieved, and the stream of action events may be applied to the current run-state of the supply chain to yield a stream of observation events. A request for one or more metrics may be received, and the stream of observation events may be transformed to predict a value for the one or more metrics. The predicted value for the one or more metrics may be provided as output for the epoch, where a future run-state of the supply chain is generated based on output for a plurality of epochs, including the epoch, for implementation in supply chain management decisions.

In other examples, a model is generated for each of the one or more metrics to transform the stream of observation events to predict the value for the one or more metrics. To generate the model, a value for the respective metric may be computed for each trace of a plurality of traces, where a trace comprises the receipt of the plurality of inputs, the generation of the stream of action events, the retrieval of the current run-state, and the application of the stream of action events to the current run-state, and the trace is repeated to produce the plurality of traces, the value for the respective metric may be aggregated over the plurality of traces, and the model may be generated based on the aggregation.

In further examples, to generate the stream of action events, a plurality of action events may be determined based on the plurality of inputs, and the plurality of action events may be merged to generate the stream of action events. For each type of action event, logic may be defined for updating a run-state of the supply chain based on the respective action event. A type of each action event may be determined within the stream of action events, and the respective logic for each action event within the stream of action events may be applied to the current run-state of the supply chain to yield the stream of observation events.

In yet further examples, the value for the one or more metrics provided as output may be displayed in one or more of a graphical and tabular format in a user interface. A report that includes the value for the one or more metrics provided as output may be generated. The per epoch run-state of the supply chain may be simulated for each of a plurality of items at a plurality of nodes of the network for the plurality of epochs.

According to other examples, systems for simulating a per epoch run-state of a supply chain for an item at a node of a network are described. An example system may include a processor, and a memory communicatively coupled to the processor that stores instructions. When executed by the processor, the instructions cause the system to receive, for an epoch, a plurality of inputs. The plurality of the inputs may include at least a forecasted demand for the item at the node, domain logic associated with the supply chain, and one or more policies. The instructions further cause the system to generate a stream of action events based on the plurality of inputs, retrieve a current run-state of the supply chain, and apply the stream of action events to the current run-state of the supply chain to yield a stream of observation events. The instructions further cause the system to receive a request for one or more metrics, transform the stream of observation events to predict a value for the one or more metrics, and provide the predicted value for the one or more metrics as output for the epoch, where a future run-state of the supply chain is generated based on output for a plurality of epochs, including the epoch, for implementation in supply chain management decisions.

In some examples, action events within the stream of action events include a start action event, a demand action event, a receive shipment action event, a proactive replenish action event, and/or reactive replenish action event. The forecasted demand for the item may be a probability distribution of demand for the item at the node during the epoch. A single demand action event may be generated based on a total number of items predicted to be sold during the epoch based on the probability distribution of demand or a plurality of demand action events may be generated, each representing one or more of the total number items predicted to be sold at a particular time during the epoch based on the probability distribution of demand.

In further examples, the domain logic associated with the supply chain may include network inputs, product inputs, node inputs, arc inputs, and/or operation perturbations. The one or more policies may be generated based on the current run-state of the supply chain and one or more business objectives. The policies may include a proactive policy that is evaluated at a single fixed time during the epoch and/or a reactive policy that is evaluated in response to receiving new information associated with the current run-state of the supply chain or the one or more business objectives. The plurality of inputs may further include known external inputs associated with the epoch.

In yet further examples, the one or more metrics may be associated with an inventory level of the item at the node and changes to the inventory level during the epoch. The metrics may include one or more of requested, requested proactive, requested reactive, on hand before delivery, on order before delivery, on hand after delivery, on order after delivery, on hand end of day, on order end of day, backroom units after delivery, allocated, allocated shortage, allocated overage, shipped, shipped vcp, shipped ssp, shipped each, received, received vcp, received ssp, had no stockouts, stockouts, unfilled demand, first pass units, stocking density, and ideal inventory position. A type of the metrics requested may be based on a type of simulation being performed and/or a subsequent process for which the output is to be provided as input.

According to further examples, non-transitory computer-readable media with instructions stored thereon for simulating a per epoch run-state of a supply chain for an item at a node of a network are described. The instructions may include receiving, for an epoch, a plurality of inputs, including at least a forecasted demand for the item at the node, domain logic associated with the supply chain, and one or more policies. The instructions may also include generating a stream of action events based on the plurality of inputs, retrieving a current run-state of the supply chain, and applying the stream of action events to the current run-state of the supply chain to yield a stream of observation events. The instructions may further include receiving a request for one or more metrics, transforming the stream of observation events to predict a value for the one or more metrics, and providing the predicted value for the one or more metrics as output for the epoch, where a future run-state of the supply chain is generated based on output for a plurality of epochs, including the epoch, for implementation in supply chain management decisions.

In some examples, each action event in the stream of action events may yield a corresponding observation event in the stream of observation events.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The present disclosure is not to be limited in terms of the particular embodiments described in this application, which are intended as illustrations of various aspects. Many modifications and variations can be made without departing from its spirit and scope. Functionally equivalent methods and systems within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only, and is not intended to be limiting.

The above specification, examples and data provide a complete description of the use of the invention. Since many embodiments of the invention can be made without departing from the spirit and scope of the invention, the invention resides in the claims hereinafter appended.

The invention claimed is:

1. A method for simulating a per epoch run-state of a supply chain for an item at a node of a supply chain network, the method comprising:
   for an epoch, receiving, at a simulation computing system, a plurality of inputs including at least a forecasted demand distribution for the item at the node, a domain logic associated with the supply chain, and one or more policies;
   executing, on the simulation computing system, a plurality of iterations of a simulation process for the epoch at the node, for each of the plurality of iterations the simulation process includes:
      selecting a sampled demand value from the forecasted demand distribution;
      generating a stream of action events based on the plurality of inputs, including the selected sample demand value;
      retrieving a current run-state of the supply chain for the supply chain network, the current run-state including inventory for the item across a plurality of nodes including the node and on-order transfers; and
      applying the stream of action events to the current run-state of the supply chain to yield a stream of observation events;
   executing, on the simulation computing system, an aggregation process, the aggregation process includes:
      receiving the stream of observation events from each of the plurality of iterations from the simulation process;
      receiving at least one request for one or more metrics; and
      in response to receiving each request of the at least one request:
         transforming the stream of observation events to determine predicted values for the one or more metrics; and
         providing the predicted values for the one or more metrics as output for the epoch;
   providing a user-interface, wherein the user interface is configured to receive inputs selecting:
      the item from among a plurality of items available for simulation within the supply chain network; and
      the node from among the plurality of nodes included within the supply chain network, and
   displaying the predicted values for the one or more metrics in response to receiving the inputs.

2. The method of claim 1, wherein a future run-state of the supply chain is generated based on output for a plurality of epochs, including the epoch, for implementation in supply chain management decisions.

3. The method of claim 1, further comprising, performing a simulation process for each of a plurality of subsequent epochs, each of the plurality of subsequent epochs having an associated forecasted demand distribution for the item at the node.

4. The method of claim 1, further comprising executing at least one iteration of the plurality of iterations of the simulation process for the epoch at each of a plurality of interrelated nodes within the supply chain network.

5. The method of claim 1, further comprising simulating the per epoch run-state of the supply chain for each of a plurality of items at a plurality of nodes of the supply chain network for the plurality of epochs.

6. The method of claim 1, wherein transforming the stream of observation events to predict the values for the one or more metrics comprises generating a model for each of the one or more metrics, and wherein generating the model for each of the one or more metrics comprises:
   computing a value for the respective metric for each trace of a plurality of traces, wherein a trace comprises the receipt of the plurality of inputs, the generation of the stream of action events, the retrieval of the current run-state, and the application of the stream of action events to the current run-state, and the trace is repeated to produce the plurality of traces;
   aggregating the value for the respective metric over the plurality of traces; and
   generating the model based on the aggregation.

7. The method of claim 1, wherein generating the stream of action events comprises:
   determining a plurality of action events based on the plurality of inputs; and
   merging the plurality of action events to generate the stream of action events.

8. The method of claim 1, wherein applying the stream of action events to the current run-state of the supply chain to yield the stream of observation events comprises:
   determining a type of each action event within the stream of action events; and
   applying respective logic for each action event within the stream of action events to the current run-state of the supply chain.

9. The method of claim 1, wherein providing the predicted values for the one or more metrics as the output for the epoch comprises displaying the predicted values for the one or more metrics in one or more of a graphical, tabular, and list format in the user interface.

10. A system for simulating a per epoch run-state of a supply chain for an item at a node of a supply chain network, the system comprising:
    a processor;
    a memory communicatively coupled to the processor, the memory storing instructions that, when executed by the processor, cause the system to:
       for an epoch, receive a plurality of inputs, including at least a forecasted demand distribution for the item at the node, a domain logic associated with the supply chain, and one or more policies;
       execute a plurality of iterations of a simulation process for the epoch at the node by causing the system to for each of the plurality of iterations:
          select a sampled demand value from the forecasted demand distribution;
          generate a stream of action events based on the plurality of inputs, including the selected sample demand value;
          retrieve a current run-state of the supply chain for the supply chain network, wherein the current run-state includes inventory for the item across a plurality of nodes including the node and on-order transfers;
          apply the stream of action events to the current run-state of the supply chain to yield a stream of observation events;

execute an aggregation process by causing the system to:
  receive at least one request for one or more metrics; and
  in response to each request of the at least one request:
    transform the stream of observation events to predict values for the one or more metrics; and
    provide the predicted values for the one or more metrics as output for the epoch, wherein a future run-state of the supply chain is generated based on output for a plurality of epochs, including the epoch;
  provide a user-interface, wherein the user interface is configured to receive inputs selecting:
    the item from among a plurality of items available for simulation within the supply chain network; and
    the node from among the plurality of nodes included within the supply chain network, and
  display the predicted values for the one or more metrics in response to receiving the inputs.

11. The system of claim 10, wherein action events within the stream of action events include one or more of a start action event, a demand action event, a receive shipment action event, a proactive replenish action event, and a reactive replenish action event.

12. The system of claim 10, wherein a discrete demand for the item is selected from the forecasted demand distribution, the discrete demand comprising one of:
  a single demand action event is generated based on a total number of items predicted to be sold during the epoch based on a probability distribution of demand; and
  a plurality of demand action events are generated, each representing one or more of the total number items predicted to be sold at a particular time during the epoch based on the probability distribution of demand.

13. The system of claim 10, wherein the domain logic associated with the supply chain includes one or more of supply chain network inputs, product inputs, node inputs, arc inputs, and operation perturbations.

14. The system of claim 10, wherein the one or more policies are generated based on the current run-state of the supply chain and one or more business objectives, and include one or more of:
  a proactive policy that is evaluated at a single fixed time during the epoch, and
  a reactive policy that is evaluated in response to receiving new information associated with the current run-state of the supply chain or the one or more business objectives.

15. The system of claim 10, wherein the plurality of inputs further include known external inputs associated with the epoch.

16. The system of claim 10, wherein the one or more metrics are associated with an inventory level of the item at the node and changes to the inventory level during the epoch.

17. The system of claim 16, wherein the one or more metrics include one or more of requested, requested proactive, requested reactive, on hand before delivery, on order before delivery, on hand after delivery, on order after delivery, on hand end of day, on order end of day, backroom units after delivery, allocated, allocated shortage, allocated overage, shipped, shipped vcp, shipped ssp, shipped each, received, received vcp, received ssp, had no stockouts, stockouts, unfilled demand, first pass units, stocking density, and ideal inventory position.

18. The system of claim 10, wherein a type of the one or more metrics requested is based on one or more of a type of simulation being performed, and a subsequent process for which the output is to be provided as input.

19. A non-transitory computer-readable medium with instructions stored thereon for simulating a per epoch run-state of a supply chain for an item at a node of a supply chain network, the instructions comprising:
  for an epoch, receiving a plurality of inputs, including at least a forecasted demand distribution for the item at the node, a domain logic associated with the supply chain, and one or more policies;
  execute a plurality of iterations of a simulation process for the epoch at the node, for each of the plurality of iterations the simulation process includes to:
    select a sampled demand value from the forecasted demand distribution;
    generate a stream of action events based on the plurality of inputs, including the selected sample demand value;
    retrieve a current run-state of the supply chain for the supply chain network, wherein the current run state includes inventory for the item across a plurality of nodes including the node and on-order transfers;
    apply the stream of action events to the current run-state of the supply chain to yield a stream of observation events;
  execute an aggregation process, the aggregation process includes to:
    receive at least one request for one or more metrics; and
    in response to each request of the at least one request:
      transform the stream of observation events to predict values for the one or more metrics; and
      provide the predicted values for the one or more metrics as output for the epoch, wherein a future run-state of the supply chain is generated based on output for a plurality of epochs, including the epoch; and
  provide a user-interface, wherein the user interface is configured to receive inputs selecting:
    the item from among a plurality of items available for simulation within the supply chain network; and
    the node from among the plurality of nodes included within the supply chain network, and
  display the predicted values for the one or more metrics in response to receiving the inputs.

20. The non-transitory computer-readable medium of claim 19, wherein each action event in the stream of action events yields a corresponding observation event in the stream of observation events.

21. The method of claim 1, wherein the user interface further configured to receive inputs selecting a scenario and wherein the predicted values for the one or more metrics presented are further based the selected scenario.

* * * * *